United States Patent
Youn et al.

(10) Patent No.: US 11,621,639 B2
(45) Date of Patent: Apr. 4, 2023

(54) SWITCHING REGULATOR AND OPERATING METHOD

(71) Applicant: SAMSUNG ELECTRONICS CO., LTD., Suwon-si (KR)

(72) Inventors: Hyosang Youn, Hwaseong-si (KR); Minwoo Kim, Seoul (KR); Hyungju Park, Hwaseong-si (KR); Deokgi Lee, Seoul (KR); Changseok Chae, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 17/329,226

(22) Filed: May 25, 2021

(65) Prior Publication Data

US 2022/0123653 A1 Apr. 21, 2022

(30) Foreign Application Priority Data

Oct. 16, 2020 (KR) .................. 10-2020-0134608

(51) Int. Cl.
*H02M 3/158* (2006.01)
*H02M 3/18* (2006.01)

(52) U.S. Cl.
CPC .......... *H02M 3/1582* (2013.01); *H02M 3/18* (2013.01)

(58) Field of Classification Search
CPC ...... H02M 3/18; H02M 3/1582; H02M 3/137; H02M 3/142; H02M 3/156; H02M 3/158; H02M 3/1584
See application file for complete search history.

(56) References Cited

U.S. PATENT DOCUMENTS

| | | | |
|---|---|---|---|
| 8,305,055 B2 | 11/2012 | Wu et al. | |
| 8,570,006 B2 | 10/2013 | Moussaoui et al. | |
| 10,050,522 B2 | 8/2018 | Scheel | |
| 2017/0338680 A1 | 11/2017 | Baier et al. | |
| 2017/0353105 A1* | 12/2017 | Solie | H02M 1/36 |
| 2021/0050779 A1* | 2/2021 | Deng | H02M 3/073 |
| 2021/0242768 A1* | 8/2021 | Ishikura | H03K 17/063 |

FOREIGN PATENT DOCUMENTS

| | | |
|---|---|---|
| KR | 1020130032585 | 4/2013 |
| KR | 1020150139697 | 12/2015 |
| KR | 1020180126940 | 11/2018 |

* cited by examiner

*Primary Examiner* — Nguyen Tran

(74) *Attorney, Agent, or Firm* — Volentine, Whitt & Francos, PLLC

(57) ABSTRACT

A switching regulator generates an output voltage from an input voltage and includes; a charge sharing circuit that selectively forms one of a first charge sharing path between a first flying capacitor and a second bootstrap capacitor and a second charge sharing path between a second flying capacitor and a first bootstrap capacitor based on first and second conversion modes.

19 Claims, 19 Drawing Sheets

SWITCHING REGULATOR AND OPERATING METHOD

CROSS-REFERENCE TO RELATED APPLICATION

This application claims priority under 35 U.S.C. § 119 to Korean Patent Application No. 10-2020-0134608 filed on Oct. 16, 2020 in the Korean Intellectual Property Office, the subject matter of which is hereby incorporated by reference.

BACKGROUND

The inventive concept relates generally a switching regulators capable of supporting multiple conversion modes, as well as operating methods for switching regulators.

A supply voltage may be generated to provide power to electronic components, and the level of the supply voltage to be provided to the electronic components may be changed to reduce power consumption by the electronic components. For example, in the case of a digital circuit processing digital signals, a low level of supply voltage may be provided when a relatively low performance is required, and on the contrary, a high level of supply voltage may be provided when a relatively high performance is requested. Accordingly, a switching regulator capable of generating various levels of supply voltages may be used.

The switching regulator may include switching elements to support multiple conversion modes. The switching elements must be turned ON/OFF without error in response to control signal(s) in order for the switching regulator to operate smoothly. To this end, a sufficient gate-source voltage must be ensured for the switching elements, and a circuit design study thereof has been actively conducted.

SUMMARY

Embodiments of the inventive concept provide switching regulators that provide improved performance by ensuring a sufficient gate-source voltage for switching elements with a minimum circuit component, as well as related operating methods for such switching regulators.

According to an aspect of the inventive concept, there is provided a switching regulator that generates an output voltage from an input voltage. The switching regulator includes; a first switching circuit including a first transistor, a first flying capacitor and a first bootstrap capacitor, wherein in a first conversion mode, the first transistor selectively connects a first node receiving the input voltage in response to a first switching control signal, and the first bootstrap capacitor boosts the first switching control signal, a second switching circuit including a second transistor, a second flying capacitor and a second bootstrap capacitor, wherein in a second conversion mode, the second transistor selectively connects a second node receiving the output voltage in response to a second switching control signal, and the second bootstrap capacitor boosts the second switching control signal, and a charge sharing circuit configured to selectively form at least one of a first charge sharing path between the first flying capacitor and the second bootstrap capacitor and a second charge sharing path between the second flying capacitor and the first bootstrap capacitor in response to one of the first conversion mode and the second conversion mode.

According to an aspect of the inventive concept, there is provided a switching regulator that generates an output voltage from an input voltage. The switching regulator includes; a first transistor connected to a first node receiving the input voltage and alternately turned ON/OFF in buck mode, a first bootstrap capacitor that boosts a gate voltage of the first transistor, a second transistor connected to a second node outputting the output voltage and continuously turned ON in buck mode, a second bootstrap capacitor that boosts a gate voltage of the second transistor, and a first flying capacitor that shares charge with the second bootstrap capacitor in buck mode.

According to an aspect of the inventive concept, there is provided an operating method for a switching regulator. The operating method includes; disconnecting a first transistor from a first node receiving an input voltage during a first period in buck mode, charging a first bootstrap capacitor and a first flying capacitor with the input voltage during the first period in buck mode, connecting the first transistor to the first node during a second period in buck mode following the first period in buck mode, boosting a gate voltage of the first transistor by the first bootstrap capacitor during the second period in buck mode, and sharing charge with a second bootstrap capacitor using the first flying capacitor in the second period to boost a gate voltage of a second transistor connected to a second node outputting an output voltage of the switching regulator.

BRIEF DESCRIPTION OF THE DRAWINGS

Embodiments of the inventive concept will be more clearly understood from the following detailed description taken in conjunction with the accompanying drawings in which.

DETAILED DESCRIPTION

Throughout the written description and drawings, like reference numbers and labels are used to denote like or similar elements and/or features. Hereinafter, certain embodiments of the inventive concept will be described with reference to the accompanying drawings.

Figure 1:
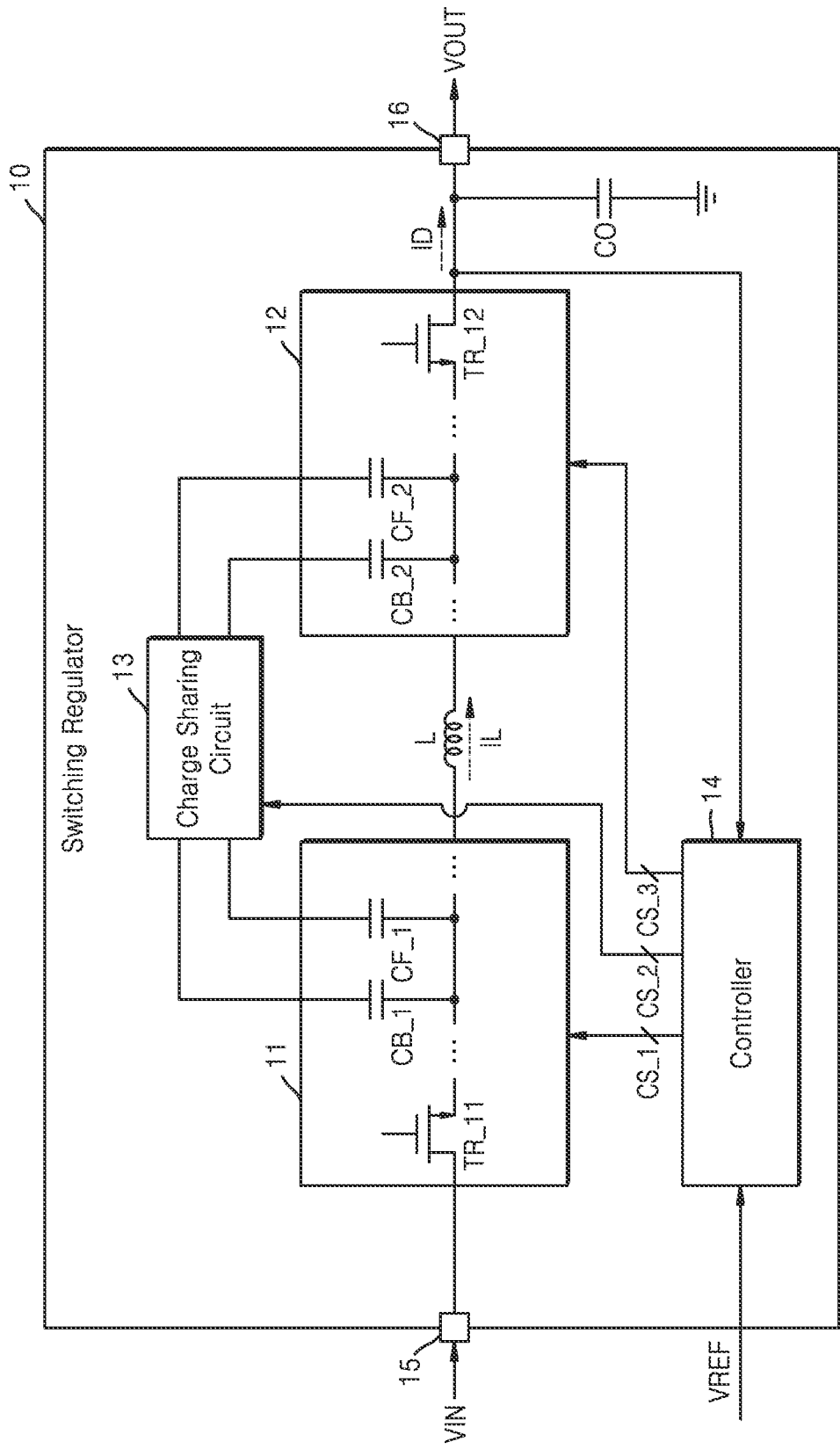
FIG. 1 is a block diagram illustrating a switching regulator according to embodiments of the inventive concept.

Figure (FIG. 1 is a block diagram illustrating a switching regulator 10 according to embodiments of the inventive concept. An input node 15 of the switching regulator 10 may receive an input voltage VIN or be grounded, and an output node 16 of the switching regulator 10 may output an output voltage VOUT or be grounded. The output voltage VOUT may be used as a supply voltage of one or more electrical components (hereinafter, singularly or collectively referred to as a "load"). In the description that follows, the switching regulator 10 is principally described as a non-inverting buck-boost converter including four switching elements. However, inventive concept is not limited thereto, and other switching regulator according to embodiments of the inventive concept may be variously configured.

Referring to FIG. 1, the switching regulator 10 includes a first switching circuit 11, a second switching circuit 12, a charge sharing circuit 13 and a controller 14. In some embodiments, one or more components included in the switching regulator 10 may be configured in at least one semiconductor package. However, in some embodiments, the switching regulator 10 may include a printed circuit board (PCB), and at least two of the components of the switching regulator 10 may be mounted on the PCB as separate semiconductor packages.

Here, the switching regulator 10 may operate as an electronic circuit capable of generating the output voltage VOUT by selectively switching one or more element(s) ON/OFF. For example, the first and second switching circuits 11 and 12 and the charge sharing circuit 13 of the switching regulator 10 may turn ON/OFF at least one switching element in response to (or based on) first, second and/or third control signals CS_1, CS_2 and/or CS_3 (hereinafter, "first to third control signals CS_1 to CS_3") provided by the controller 14. In this manner, the controller 14 may variably adjust the impedance (e.g., resistance, capacitance and/or inductance) of a current path passing an inductor current IL passing through an inductor L. Further in this regard, the first to third control signals CS_1 to CS_3 may variously include switching control signal(s) respectively configured to control the turning ON and/or turning OFF of switching elements included in the first switching circuit 11, the second switching circuit 12 and/or the charge sharing circuit 13.

Here, the terms "ON" and "OFF" denote assigned functional states for the switching element (e.g., an ON state in which ends of a switching element are electrically connected, and an OFF state in which ends of the switching element are electrically disconnected). Thus, components electrically connected through a switching element having an ON state may be referred to as being "connected." In contrast, components that are always connected (e.g., hardwired together) may be referred to as being "coupled."

Figure 3A:
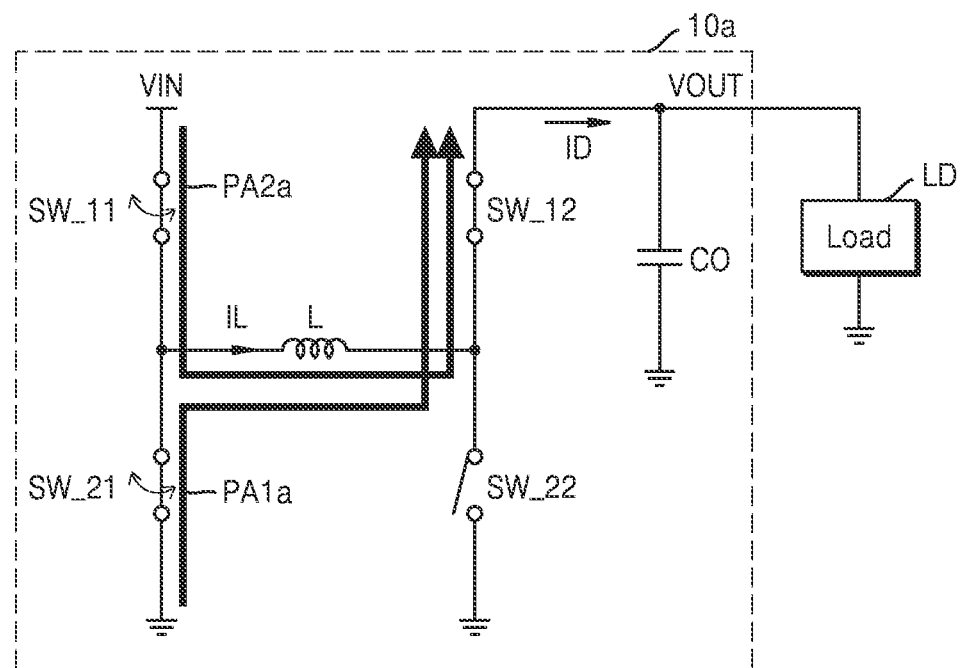
FIGS. 3A, 3B, 4A, 4B, 5A and 5B are respective, operational circuit diagrams variously illustrating the operation of switching regulators in multiple conversion modes according to embodiments of the inventive concept.

In some embodiments, and as described in relation to FIG. 3A for example, the switching regulator 10 may generate a direct current (DC) output voltage VOUT from a DC input voltage VIN. Thus, the switching regulator 10 may be referred to as a voltage converter. For example, the switching regulator 10 may, when operating in buck mode (e.g., a first conversion mode), generate the output voltage VOUT having a lower level than a level of the input voltage VIN. The switching regulator 10 may, when operating in boost mode (e.g., a second conversion mode), generate the output voltage VOUT having a higher level than the level of the input voltage VIN.

In this regard, the switching regulator 10 will be understood as performing a DC-to-DC conversion in either buck mode or boost mode, but the inventive concept is not limited thereto. Other embodiments of the inventive concept may be applied to other types of switching regulators capable of operating according to various conversion modes and possibly applied to alternating current (AC)-to-DC conversion operations.

In the illustrated example of FIG. 1, the first switching circuit 11 may include a first transistor TR_11 connected to the input node 15, a first flying capacitor CF_1, and a first bootstrap capacitor CB_1 that boosts a gate voltage of the first transistor TR_11. Similarly, the second switching circuit 12 may include a second transistor TR_12 connected to the output node 16, a second flying capacitor CF_2, and a second bootstrap capacitor CB_2 that boosts a gate voltage of the second transistor TR_12. Although these are just illustrative examples, and those skilled in the art will understand the first and second switching circuits 11 and 12 may include more, or differently arranged, switching elements.

In the illustrated example of FIG. 1, the charge sharing circuit 13 may be used to selectively connect or disconnect at least one charge sharing path between the first switching circuit 11 and the second switching circuit 12. That is, in response to the second control signal CS_2, the charge sharing circuit 13 may connect/disconnect a first charge sharing path between the first flying capacitor CF_1 and the second bootstrap capacitor CB_2 and/or a second charge sharing path between the second flying capacitor CF_2 and the first bootstrap capacitor CB_1.

Thus, the first and second switching circuits 11 and 12 may adjust the inductor current IL passing through the inductor L by adjusting a voltage provided to the inductor L in response to the first and third control signals CS_1 and CS_3. For example, in response to variation in a prescribed load (e.g., load LD in FIG. 3A) driven by (or receiving) the output voltage VOUT of the switching regulator 10, the first and second switching circuits 11 and 12 may selectively define and provide a portion of the inductor current IL to the load.

In this regard, the inductor L and an output capacitor CO may be connected in series, so that the inductor current IL may be substantially matched to an output transfer current ID. In some embodiments, a capacitance of the output capacitor CO may be determined based on a current provided to a load (i.e., a load current) provided at the output node 16 of the switching regulator 10. In some embodiments, an inductance of the inductor L may be determined based on the capacitance of the output capacitor CO and/or a switching frequency. In some embodiments, the respective capacitances of the first and second bootstrap capacitors CB_1 and CB_2 and the first and second flying capacitors CF_1 and CF_2 may be determined based on the load current, a switching frequency, the input voltage VIN, and/or the output voltage VOUT.

In the illustrated example of FIG. 1, the controller 14 may generate the first and third control signals CS_1 and CS_3 in response to a reference voltage VREF and the output voltage VOUT. For example, the controller 14 may generate a feedback voltage by dividing the output voltage VOUT, and thereafter generate the first and third control signals CS_1 and CS_3 by comparing the feedback voltage with the reference voltage VREF, such that the feedback voltage matches the reference voltage VREF. Accordingly, a level of the output voltage VOUT may be determined by a level of the reference voltage VREF, and the level of the output voltage VOUT may be varied by changing the level of the reference voltage VREF.

Here, the switching regulator 10 may be set to buck mode or boost mode according to a target level (or a target output voltage) of the output voltage VOUT. For example, the controller 14 may set a conversion mode of the switching regulator 10 in response to the input voltage VIN and the target level of the output voltage VOUT. For example, the controller 14 may set the switching regulator 10 to buck mode when the target output voltage is less than the input voltage VIN, but may set the switching regulator 10 to boost mode when the target output voltage is greater than the input voltage VIN.

In the illustrated example of FIG. 1, the controller 14 may generate the second control signal CS_2 based on the set conversion mode. For example, the controller 14 may generate the second control signal CS_2 that controls the charge sharing circuit 13 in order to form the first charge sharing path between the first flying capacitor CF_1 and the second bootstrap capacitor CB_2 during a certain period while operating in buck mode. Similarly, the controller 14 may generate the second control signal CS_2 that controls the charge sharing circuit 13 to form the second charge sharing path between the second flying capacitor CF_2 and the first bootstrap capacitor CB_1 during a certain period while operating in boost mode.

Here, the first flying capacitor CF_1 together with the first bootstrap capacitor CB_1 may be charged with the input voltage VIN, and the first flying capacitor CF_1 may share a charge with the second bootstrap capacitor CB_2 through the charge sharing circuit 13. That is, the second bootstrap capacitor CB_2 may be charged from the first flying capacitor CF_1, and the charged second bootstrap capacitor CB_2 may sufficiently boost a gate voltage of the second transistor TR_12. Hereinafter, an operation of boosting the gate voltage of the second transistor TR_12 may be described as an operation of boosting a switching control signal applied to a gate of the second transistor TR_12. Accordingly, a sufficient gate-source voltage in various conversion modes may be ensured, and thus, the second transistor TR_12 may improve the performance of the switching regulator 10 by sensitively responding to the received third control signal CS_3.

Additionally, the second flying capacitor CF_2 together with the second bootstrap capacitor CB_2 may be charged by the input voltage VIN, and the second flying capacitor CF_2 may share a charge with the first bootstrap capacitor CB_1 through the charge sharing circuit 13. That is, the first bootstrap capacitor CB_1 may be charged from the second flying capacitor CF_2, and the charged first bootstrap capacitor CB_1 may sufficiently boost a gate voltage of the first transistor TR_11. Hereinafter, an operation of boosting the gate voltage of the first transistor TR_11 may be described as an operation of boosting a switching control signal applied to a gate of the first transistor TR_11. Accordingly, a sufficient gate-source voltage in various conversion modes may be ensured, and thus, the first transistor TR_11 may improve the performance of the switching regulator 10 by sensitively responding to the received first control signal CS_1.

In some embodiments, because a sufficient gate-source voltage is ensured in buck mode or boost mode, the first and second transistors TR_11 and TR_12 may be implemented as an N-channel metal oxide semiconductor (nMOS) transistors having a design area less than that of a P-channel metal oxide semiconductor (pMOS) transistor. As a result, a degree of integration for the switching regulator 10 may be improved and circuit miniaturization may be further realized.

In some embodiments, the capacitances of the first and second flying capacitors CF_1 and CF_2 may be respectively less than the capacitances of the first and second bootstrap capacitors CB_1 and CB_2. Accordingly, current exceeding an allowable threshold may be limited such that it does not flow to the first and second bootstrap capacitors CB_1 and CB_2 through the charge sharing circuit 13.

Figure 2:
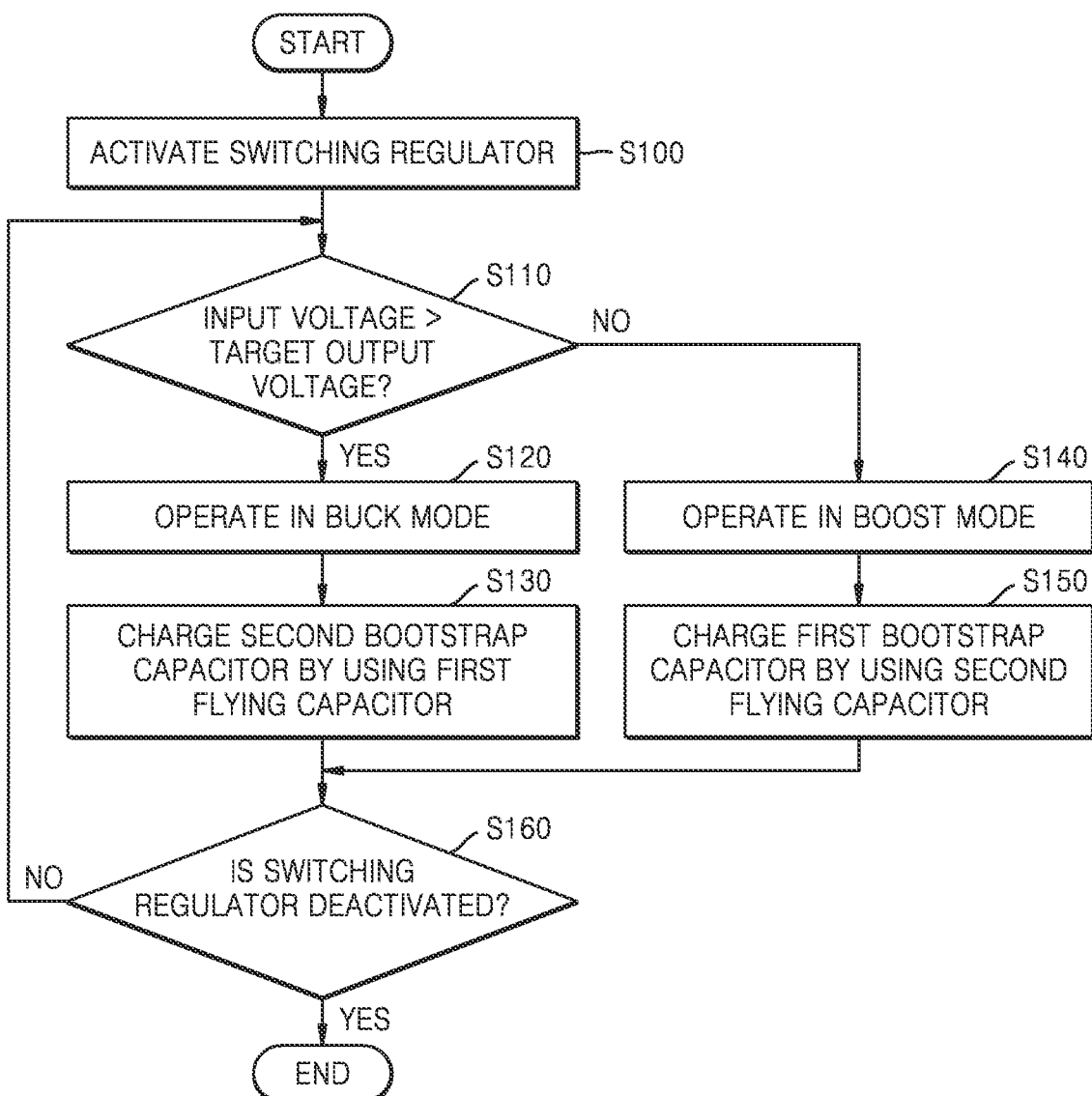
FIG. 2 is a flowchart illustrating an operating method for a switching regulator according to embodiments of the inventive concept.

FIG. 2 is a flowchart illustrating an operating method for a switching regulator according to embodiments of the inventive concept. Here, the method of FIG. 2 will be described in the context of the switching regulator 10 of FIG. 1.

Referring to FIGS. 1 and 2, the switching regulator 10 may be activated (S100). Thereafter, the switching regulator 10 may determine whether an input voltage is greater than an output target voltage by comparing the input voltage with the output target voltage (S110). When the input voltage is greater than the output target voltage (S110=YES), the switching regulator 10 may operate in buck mode (S120), else when the input voltage is not greater than the output target voltage (S110=NO), the switching regulator 10 may operate in boost mode (S140).

In relation to buck mode (S120), for example, the second transistor TR_12 of the second switching circuit 12 may be connected to the output node 16 and transistors including the first transistor TR_11 of the first switching circuit 11 may be alternately turned ON/OFF in response to the first control signal CS_1. Accordingly, during a certain period of buck mode, the second bootstrap capacitor CB_2 may be charged through the charge sharing circuit 13 using the first flying capacitor CF_1 (S130).

Alternately, in relation to boost mode (S140), the first transistor TR_11 of the first switching circuit 11 may be connected to the input node 15 and transistors including the second transistor TR_12 of the second switching circuit 12 may be alternately turned ON/OFF in response to the third control signal CS_3. Accordingly, during a certain period of boost mode, the first bootstrap capacitor CB_1 may be charged through the charge sharing circuit 13 using the second flying capacitor CF_2 (S150).

Thereafter, a determination may be made as to whether the switching regulator 10 is deactivated (S160). If not (S160=NO), the method of FIG. 2 returns to S110—the threshold determination of whether the input voltage is greater than the target output voltage.

In this regard, the decision basis for this threshold determination may vary by design. Alternately, for example, the switching regulator 10 may determine whether the target output voltage is less than a first target percentage (e.g., about 90%) of the input voltage VIN in order to selectively operate thereafter in buck mode or boost mode. Alternately, in another example, the switching regulator may determine whether the target output voltage is greater than a second target percentage (e.g., about 110%) of the input voltage VIN in order to selectively operate thereafter in buck mode or boost mode. Alternately, in still another example, the switching regulator 10 may selectively operate in buck mode or boost mode based on a determination of whether the target output voltage is greater than or equal to a first threshold level and is also less than or equal to the second threshold level of the input voltage VIN.

Figure 3B:
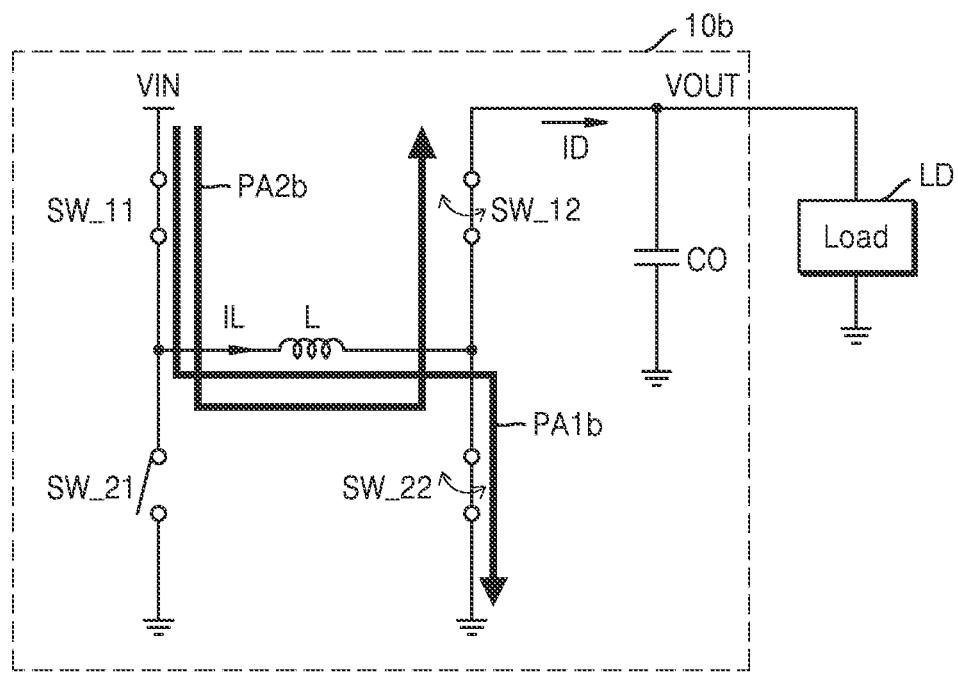

FIG. 3A is an operational circuit diagram illustrating a switching regulator 10a in buck mode, and FIG. 3B is an operational circuit diagram illustrating a switching regulator 10b in boost mode.

Referring to FIG. 3A, the switching regulator 10a may include first, second, third and fourth (hereafter collectively, "first to fourth") switching elements SW_11, SW_21, SW_12, and SW_22, inductor L and output capacitor CO, as well as load LD connected to the switching regulator 10a. Here, the first switching element SW_11 may correspond to the first transistor TR_11 of FIG. 1, and the third switching element SW_12 may correspond to the second transistor TR_12 of FIG. 1. The switching regulator 10a may support buck mode and boost mode, and the first to fourth switching elements SW_11, SW_21, SW_12, and SW_22 may be respectively turned ON/OFF according to operating mode. For example, as shown in FIG. 3A, in buck mode, the first to fourth switching elements SW_11, SW_21, SW_12, and SW_22 may be respectively turned ON/OFF according to different time periods within a defined switching cycle.

For example, during a first period indicated by a first path PA1a, the second and third switching elements SW_21 and SW_12 may be turned ON, and the first and fourth switching elements SW_11 and SW_22 may be turned OFF. Accordingly, the inductor current IL may flow from a ground node to the output capacitor CO and the load LD through the second switching element SW_21, the inductor L, and the third switching element SW_12.

During a second period following the first period indicated by a second path PA2a, the first and third switching elements SW_11 and SW_12 may be turned ON, and the second and fourth switching elements SW_21 and SW_22 may be turned OFF. Accordingly, the inductor current IL may flow from an input node to the output capacitor CO and the load LD through the first switching element SW_11, the inductor L, and the third switching element SW_12.

That is, as shown in FIG. 3A, the second transistor TR_12 (see FIG. 1) corresponding to the third switching element SW_12 must be continuously maintained in an ON state in order to be continuously connected to the output node 16 in buck mode. To this end, the gate-source voltage of the second transistor TR_12 may have a sufficient level in buck mode through the first flying capacitor CF_1 and the charge sharing circuit 13 according to embodiments of the inventive concept.

Referring to FIG. 3B, the switching regulator 10b may include the first to fourth switching elements SW_11, SW_21, SW_12, and SW_22, the inductor L, and the output capacitor CO, and the load LD may be connected to the switching regulator 10b. As shown in FIG. 3B, in boost mode, the first to fourth switching elements SW_11, SW_21, SW_12, and SW_22 may be respectively turned ON/OFF according to different period within in the defined switching cycle.

During a first period as indicated by a first path PA1b, the first and fourth switching elements SW_11 and SW_22 may be turned ON, and the second and third switching elements SW_21 and SW_12 may be turned OFF. Accordingly, the inductor current IL may flow from an input node to a ground node through the first switching element SW_11, the inductor L, and the fourth switching element SW_22.

During a second period as indicated by a second path PA2b, the first and third switching elements SW_11 and SW_12 may be turned ON, and the second and fourth switching elements SW_21 and SW_22 may be turned OFF. Accordingly, the inductor current IL may flow from the input node to the output capacitor CO and the load LD through the first switching element SW_11, the inductor L, and the third switching element SW_12.

That is, as shown in FIG. 3A, the first transistor TR_11 (see FIG. 1) corresponding to the first switching element SW_11 must be continuously maintained in an ON state in order to be continuously connected to the input node 15 in boost mode. To this end, the source-gate voltage of the first transistor TR_11 may have a sufficient level in boost mode through the second flying capacitor CF_2 and the charge sharing circuit 13 according to embodiments of the inventive concept.

Figure 4A:
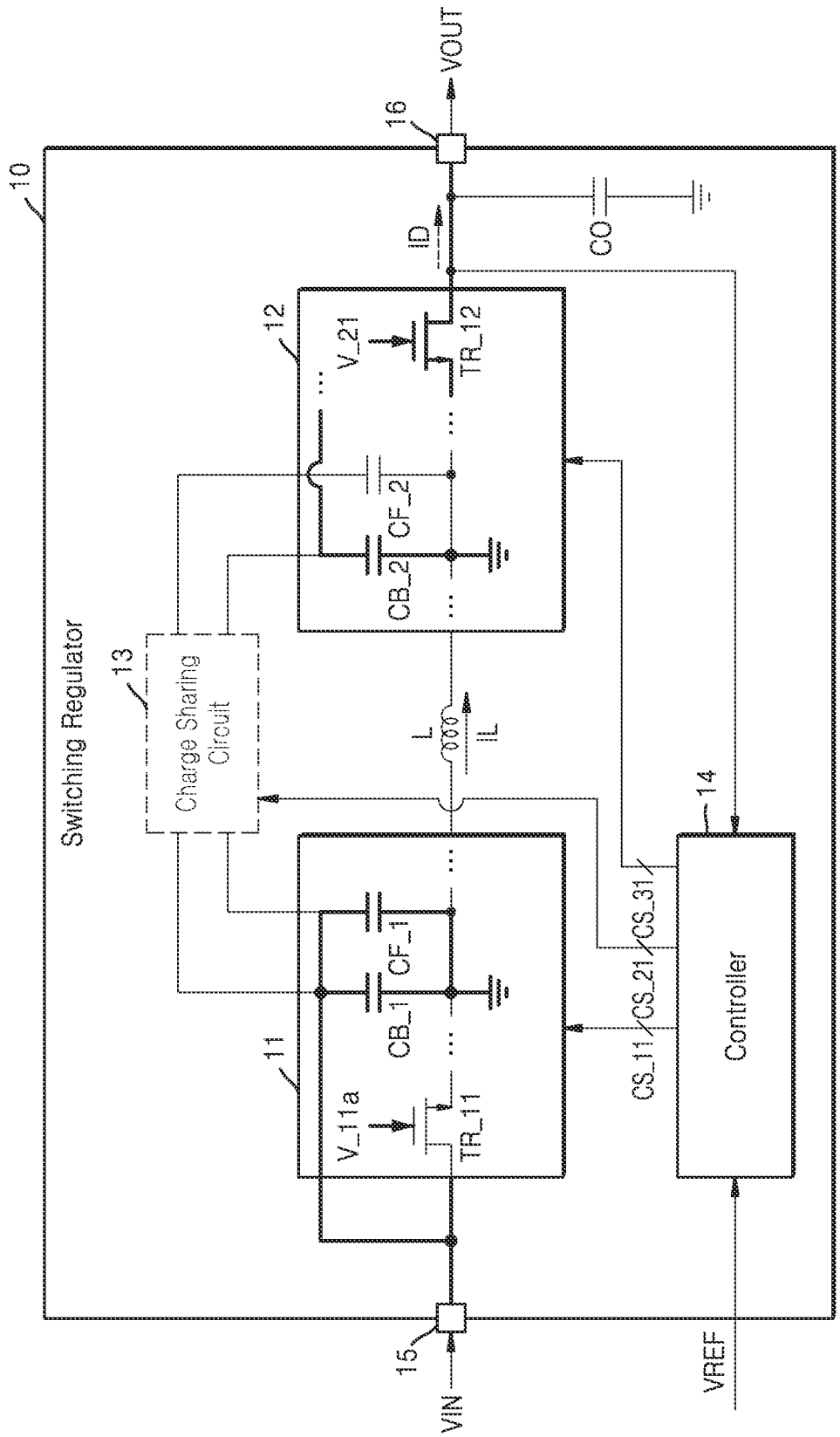
Figure 4B:
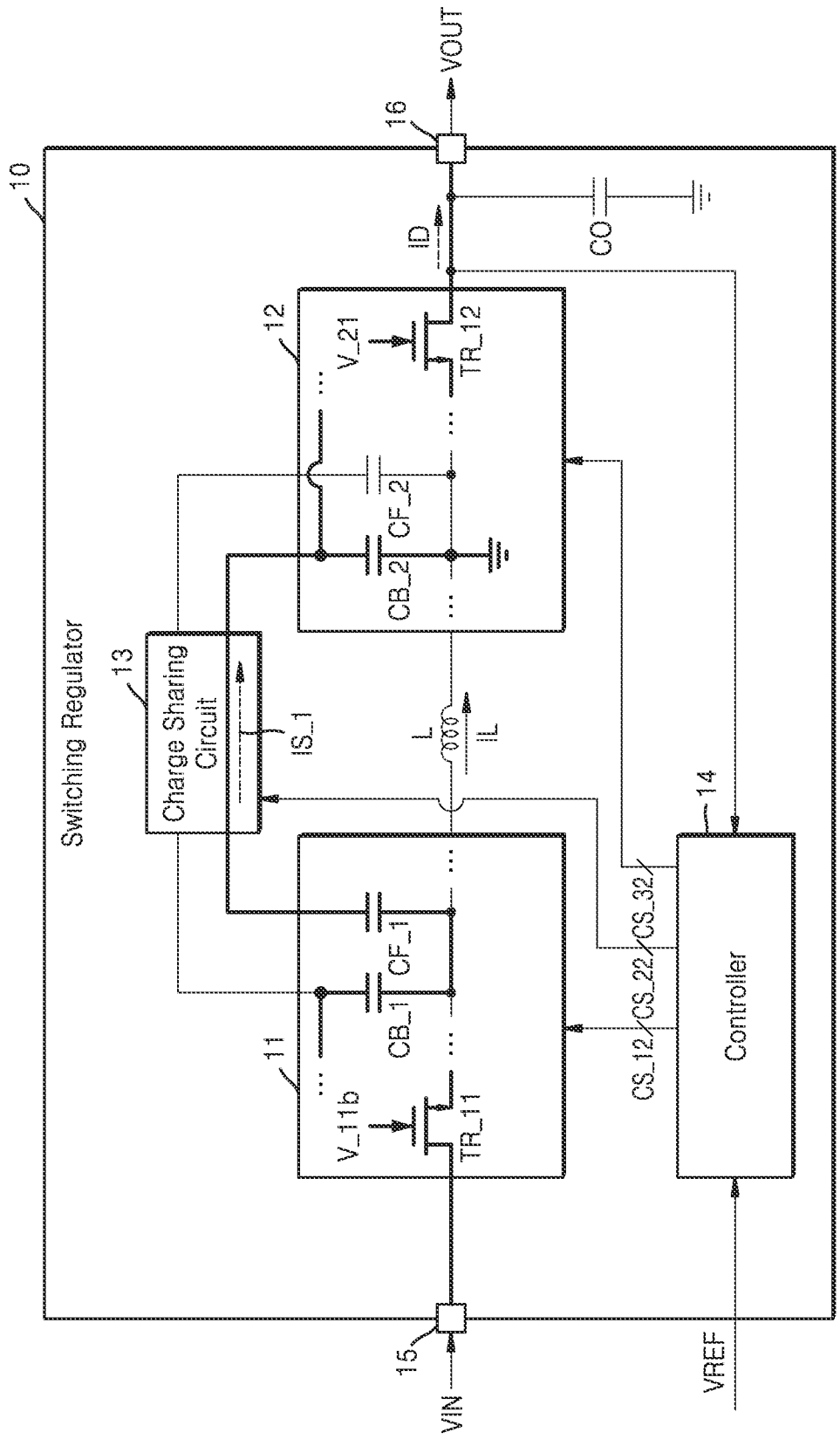

FIGS. 4A and 4B are respective, operational circuit diagrams further illustrating the switching regulator 10 in buck mode according to embodiments of the inventive concept.

Referring to FIG. 4A—during a first period and in response to a first control signal CS_11 from the controller 14—the first switching circuit 11, the first bootstrap capacitor CB_1 and the first flying capacitor CF_1 may be connected in parallel and charged by the input voltage VIN through the input node 15. Here, a first switching control signal corresponding to a first voltage V_11a may be applied to the gate of the first transistor TR_11, and the first transistor TR_11 may be turned OFF. During the first period, in the second switching circuit 12, in response to a third control signal CS 31 received from the controller 14, the second bootstrap capacitor CB_2 may boost a second switching control signal corresponding to a second voltage V_21 applied to the second transistor TR_12. Thus, the second transistor TR_12 may be turned ON by the second switching control signal and connected to the output node 16. During the first period, the charge sharing circuit 13 may be deactivated in response to a second control signal CS 21 received from the controller 14.

Referring to FIG. 4B, during a second period following the first period, in the first switching circuit 11, in response to a first control signal CS 12 received from the controller 14, the first bootstrap capacitor CB_1 may boost a first switching control signal corresponding to a first voltage V_11b applied to the first transistor TR_11, and the first transistor TR_11 may be turned ON by the first switching control signal and connected to the input node 15. During the second period, the charge sharing circuit 13 may form a first charge sharing path IS_1 between the first flying capacitor CF_1 and the second bootstrap capacitor CB_2 in response to a second control signal CS_22 received from the controller 14. The first flying capacitor CF_1 may charge the second bootstrap capacitor CB_2 through the first charge sharing path IS_1. During the second period, in the second switching circuit 12, in response to a third control signal CS_32 received from the controller 14, the second bootstrap capacitor CB_2 may boost the second switching control signal corresponding to the second voltage V_21 applied to the gate of the second transistor TR_12, and the second transistor TR_12 may be turned ON by the second switching control signal to be continuously connected to the output node 16.

In some embodiments, the second bootstrap capacitor CB_2 may periodically receive a charge in buck mode through the first charge sharing path IS_1. Accordingly, the second bootstrap capacitor CB_2 may boost the second switching control signal corresponding to the second voltage V_21 to a sufficient level.

Figure 5A:
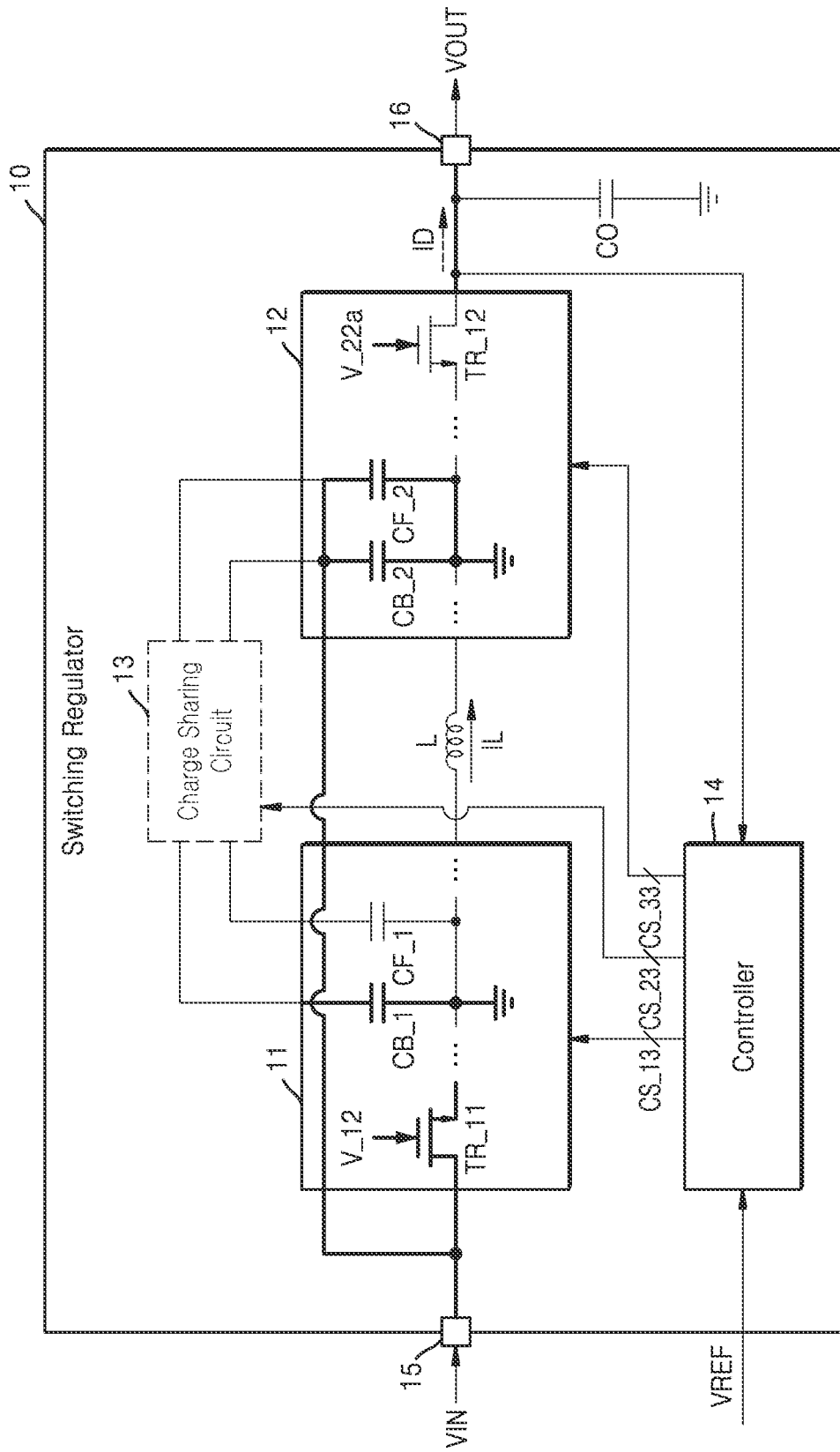
Figure 5B:
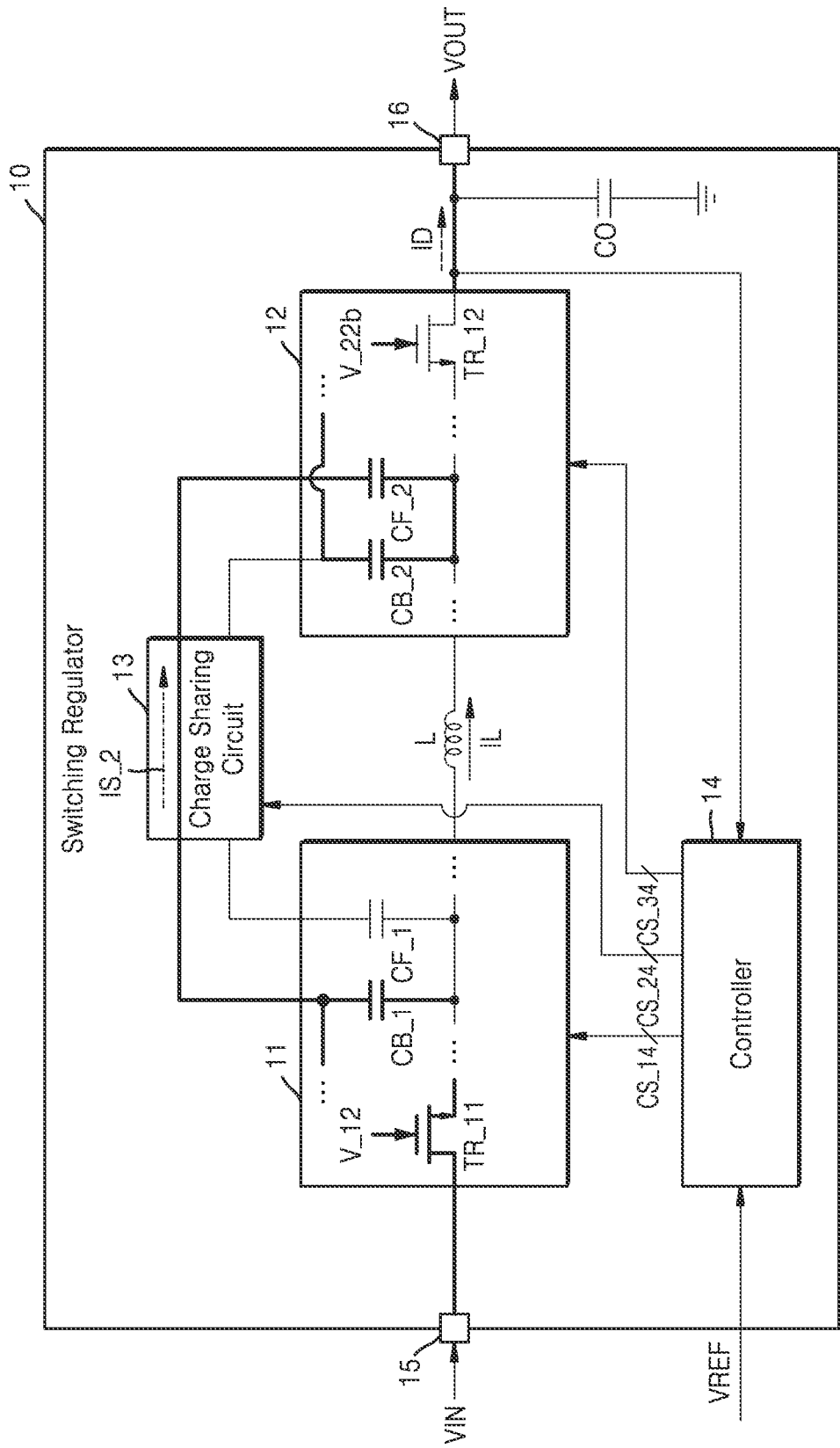

FIGS. 5A and 5B are respective, operational circuit diagrams further illustrating the switching regulator 10 in boost mode according to embodiments of the inventive concept.

Referring to FIG. 5A, during a first period, in the first switching circuit 11, in response to a first control signal CS_13 received from the controller 14, the first bootstrap capacitor CB_1 may boost a first switching control signal corresponding to a first voltage V_12 applied to the first transistor TR_11, and the first transistor TR_11 may be turned ON by the first switching control signal and connected to the input node 15. During the first period, in the second switching circuit 12, in response to a third control signal CS 33 received from the controller 14, the first bootstrap capacitor CB_1 and the second flying capacitor CF_2 may be connected in parallel to each other to be charged by the input voltage VIN through the input node 15, a second switching control signal corresponding to a second voltage V_22a may be applied to the gate of the second switching circuit 12, and the second transistor TR_12 may be turned OFF. During the second period, the charge sharing circuit 13 may be deactivated in response to a second control signal CS_23 received from the controller 14.

Referring to FIG. 5B, during a second period following the first period, in the second switching circuit 12, in response to a third control signal CS 34, the second bootstrap capacitor CB_2 may boost a second switching control signal corresponding to a second voltage V_22b applied to the gate of the second transistor TR_12, and the second transistor TR_12 may be turned ON by the second switching control signal to be connected to the output node 16. During the second period, the charge sharing circuit 13 may form a second charge sharing path IS_2 between the second flying capacitor CF_2 and the first bootstrap capacitor CB_1 in response to a second control signal CS_24 received from the controller 14. The second flying capacitor CF_2 may charge the first bootstrap capacitor CB_1 through the second charge sharing path IS_2. During the second period, in the first switching circuit 11, in response to a first control signal CS_14 received from the controller 14, the first bootstrap capacitor CB_1 may boost the first switching control signal corresponding to the first voltage V_12 applied to the gate of the first transistor TR_11, and the first transistor TR_11 may be turned ON by the first switching control signal to be continuously connected to the input node 15.

In some embodiments, the first bootstrap capacitor CB_1 may periodically receive a charge in boost mode through the second charge sharing path IS_2, and accordingly, the first bootstrap capacitor CB_1 may boost the first switching control signal corresponding to the first voltage V_12 to a sufficient level.

Figure 6:
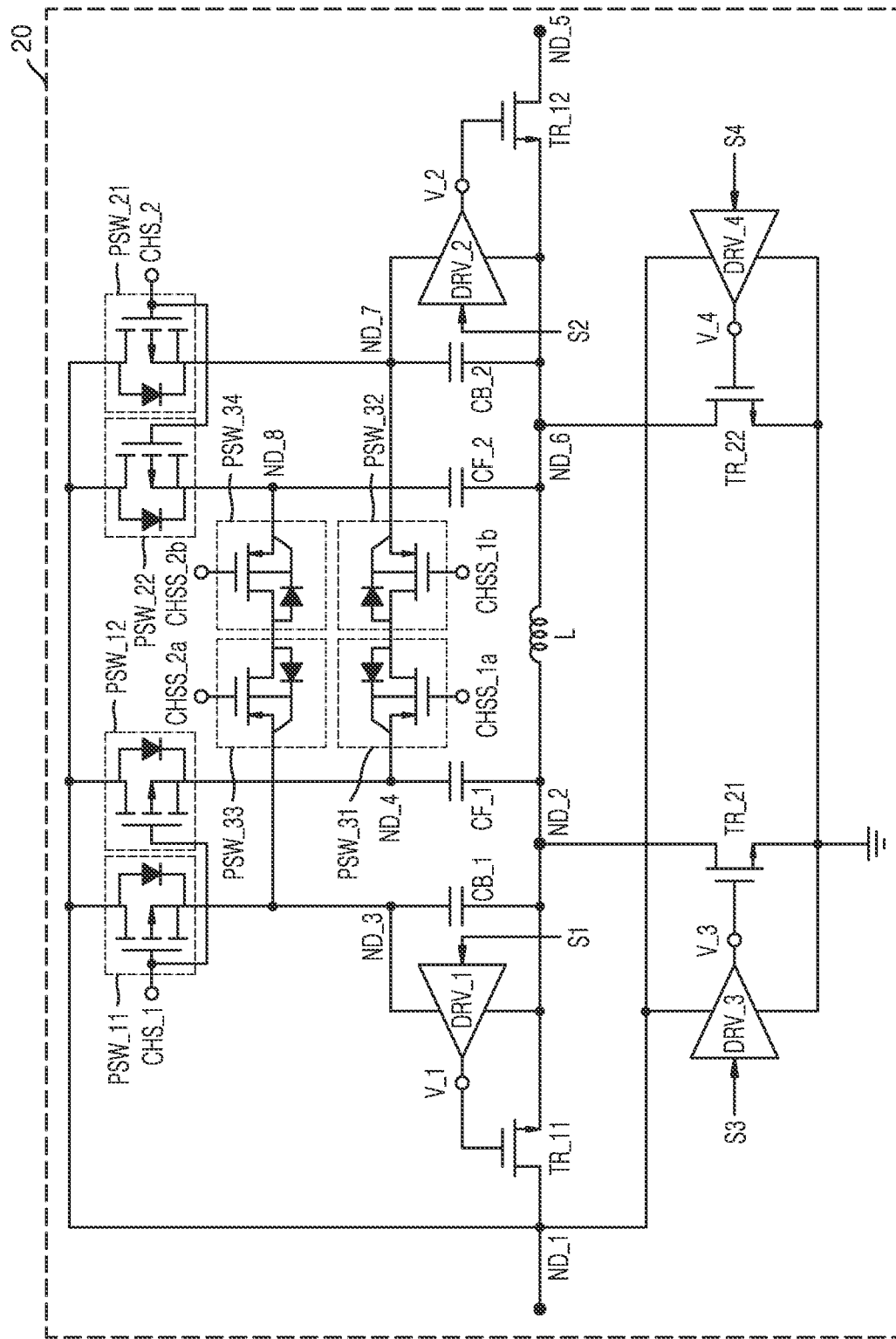
FIG. 6 is a circuit diagram illustrating a switching regulator according to embodiments of the inventive concept.

FIG. 6 is a circuit diagram illustrating a switching regulator 20 according to embodiments of the inventive concept.

Referring to FIG. 6, the switching regulator 20 may include first, second, third and fourth (hereafter collectively, "first to fourth") transistors TR_11, TR_12, TR_21, and TR_22, first, second, third, fourth, fifth, sixth, seventh and eighth (hereafter collectively "first to eighth") power switching elements PSW_11, PSW_12, PSW_21, PSW_22, PSW_31, PSW_32, PSW_33, and PSW_34, the inductor L, first and second bootstrap capacitors CB_1 and CB 2, first and second flying capacitors CF_1 and CF 2, and first to fourth drivers DRV_1 to DRV_4.

Here, the first transistor TR_11 may correspond to the first switching element SW_11 of FIG. 3A, the second transistor TR_12 may correspond to the third switching element SW_12 of FIG. 3A, the third transistor TR_21 may correspond to the second switching element SW_21 of FIG. 3A, and the fourth transistor TR_22 may correspond to the fourth switching element SW_22 of FIG. 3A. In some embodiments, the first to fourth transistors TR_11, TR_12, TR_21, and TR_22 may include nMOS transistors. In addition, first and third signals S1 and S3, and a first charging signal CHS_1 may be included in the first control signal CS_1 of FIG. 1, second and fourth signals S2 and S4, and a second charging signal CHS_2 may be included in the third control signal CS_3 of FIG. 1, and first to fourth charge sharing signals CHSS_1a, CHSS_1b, CHSS_2a, and CHSS_2b may be included in the second signal CS_2 of FIG. 1.

The first transistor TR_11 may be connected to a first node ND_1 (or an input node) through a drain, connected to a second node ND_2 through a source, and connected to an output of the first driver DRV_1 through a gate. The first bootstrap capacitor CB_1 may be connected to second and third nodes ND_2 and ND_3, and may provide a boosted voltage to the first driver DRV_1 through the third node ND_3. The first driver DRV_1 may receive the first signal S1 and generate a first voltage V_1 based on the boosted voltage from the first bootstrap capacitor CB_1 and the first signal S1 to output the first voltage V_1 to the gate of the first transistor TR_11. The first flying capacitor CF_1 may be connected to second and fourth nodes ND_2 and ND_4.

The third transistor TR_21 may be connected to the second node ND_2 through a drain, connected to a ground node through a source, and connected to an output of the third driver DRV_3 through a gate. The third driver DRV_3 may receive the third signal S3 and generate a third voltage V_3 based on an input voltage received from the first node ND_1 and the third signal S3 to output the third voltage V_3 to the gate of the third transistor TR_21.

The first power switching element PSW_11 may be connected to the first and third nodes ND_1 and ND_3 and form a path for charging the first bootstrap capacitor CB_1 in response to the first charging signal CHS_1. The second power switching element PSW_12 may be connected to the first and fourth nodes ND_1 and ND_4 and form a path for charging the first flying capacitor CF_1 in response to the first charging signal CHS_1.

The second transistor TR_12 may be connected to a fifth node ND_5 (or an output node) through a drain, connected to a sixth node ND_6 through a source, and connected to an output of the second driver DRV_2 through a gate. The inductor L may be connected to the second and sixth nodes ND_2 and ND_6. The second bootstrap capacitor CB_2 may be connected to sixth and seventh nodes ND_6 and ND_7, and may provide a boosted voltage to the second driver DRV_2 through the seventh node ND_7. The second driver DRV_2 may receive the second signal S2 and generate a second voltage V_2 based on the boosted voltage received from the second bootstrap capacitor CB_2 and the second signal S2 to output the second voltage V_2 to the gate of the second transistor TR_12. The second flying capacitor CF_2 may be connected to sixth and eighth nodes ND_6 and ND_8.

The fourth transistor TR_22 may be connected to the sixth node ND_6 through a drain, connected to a ground node through a source, and connected to an output of the fourth driver DRV_4 through a gate. The fourth driver DRV_4 may receive the fourth signal S4 and generate a fourth voltage V_4 based on an input voltage received from the first node ND_1 and the fourth signal S4 to output the fourth voltage V_4 to the gate of the fourth transistor TR_22.

The third power switching element PSW_21 may be connected to the first and seven nodes ND_1 and ND_7 and form a path for charging the second bootstrap capacitor CB_2 in response to the second charging signal CHS_2. The fourth power switching element PSW_22 may be connected to the first and eighth nodes ND_1 and ND_8 and form a path for charging the second flying capacitor CF_2 in response to the second charging signal CHS_2. As an example embodiment, each of the first to fourth power switching elements PSW_11, PSW_12, PSW_21, and PSW_22 may include an nMOS transistor and a diode. However, the inventive concept is not limited thereto, and the first to fourth power switching elements PSW_11, PSW_12, PSW_21, and PSW_22 may be variously implemented.

The fifth and sixth power switching elements PSW_31 and PSW_32 may be connected to each other in series between the fourth node ND_4 and the seven node ND_7. The fifth and sixth power switching elements PSW_31 and PSW_32 may form a charge sharing path between the first flying capacitor CF_1 and the second bootstrap capacitor CB_2 in response to the first and second charge sharing signals CHSS_1a and CHSS_1b. The seventh and eighth power switching elements PSW_33 and PSW_34 may be connected to each other in series between the third node ND_3 and the eighth node ND_8. The seventh and eighth power switching elements PSW_33 and PSW_34 may form a charge sharing path between the second flying capacitor CF_2 and the first bootstrap capacitor CB_1 in response to the third and fourth charge sharing signals CHSS_2a and CHSS_2b. As an example embodiment, each of the fifth to eighth power switching elements PSW_31, PSW_32, PSW_33, and PSW_34 may include an nMOS transistor and a diode. However, the inventive concept is not limited thereto, and the fifth to eighth power switching elements PSW_31, PSW_32, PSW_33, and PSW_34 may be variously implemented.

Figure 7A:
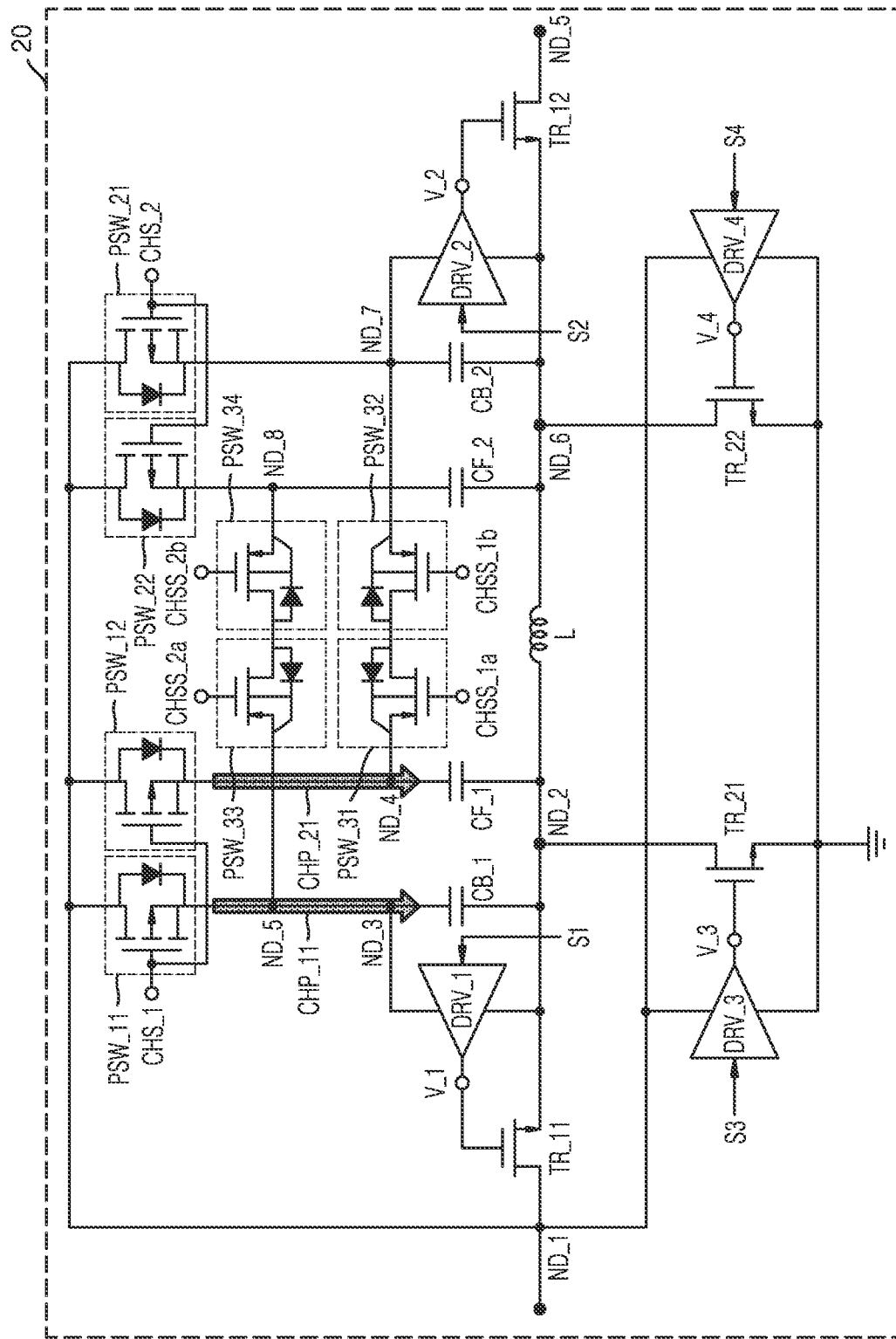
FIGS. 7A, 7B, 7C, 8A, 8B and 8C are respective, operational circuit diagrams and timing diagrams variously illustrating the operation of switching regulators in multiple conversion modes according to embodiments of the inventive concept.
Figure 7B:
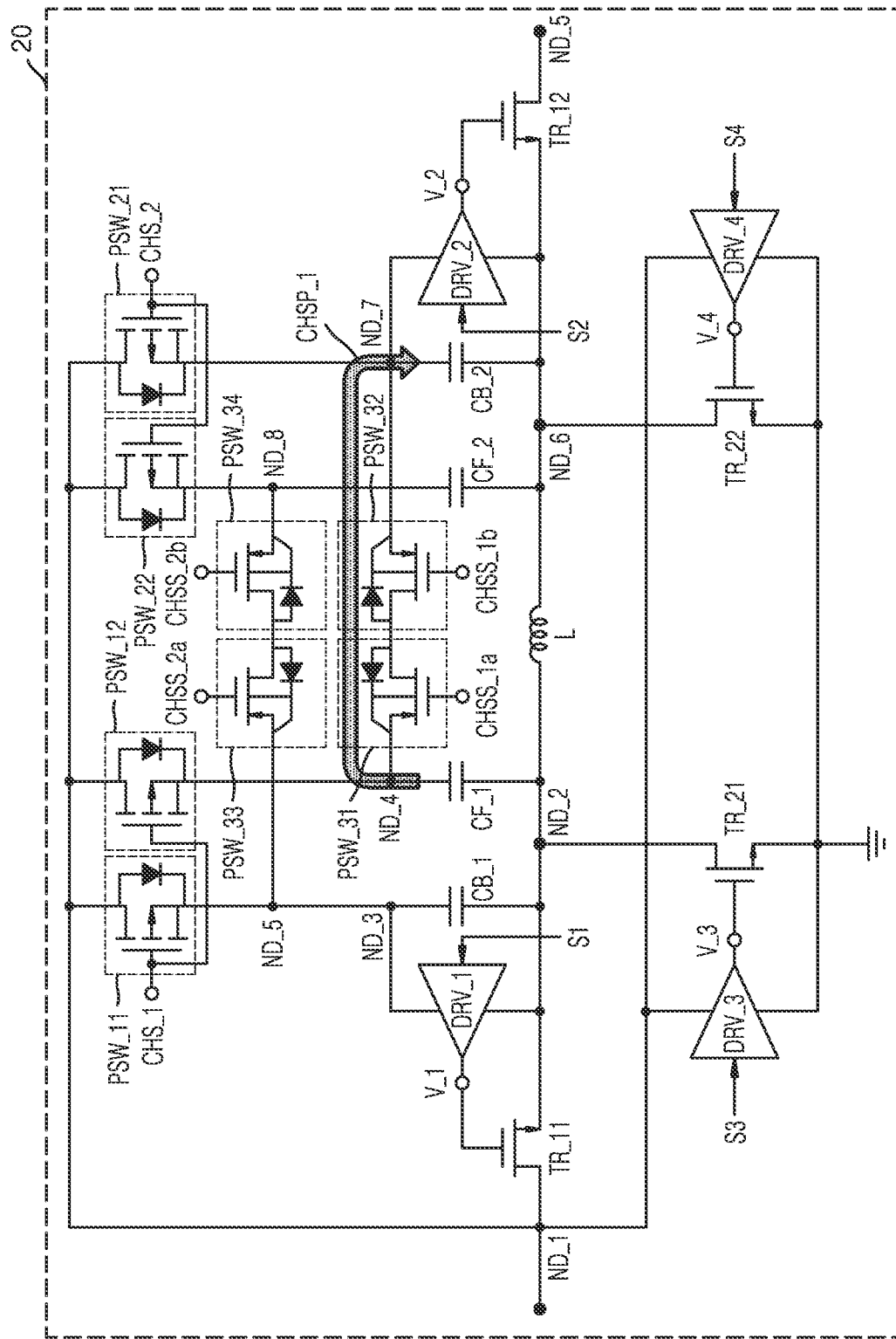
Figure 7C:
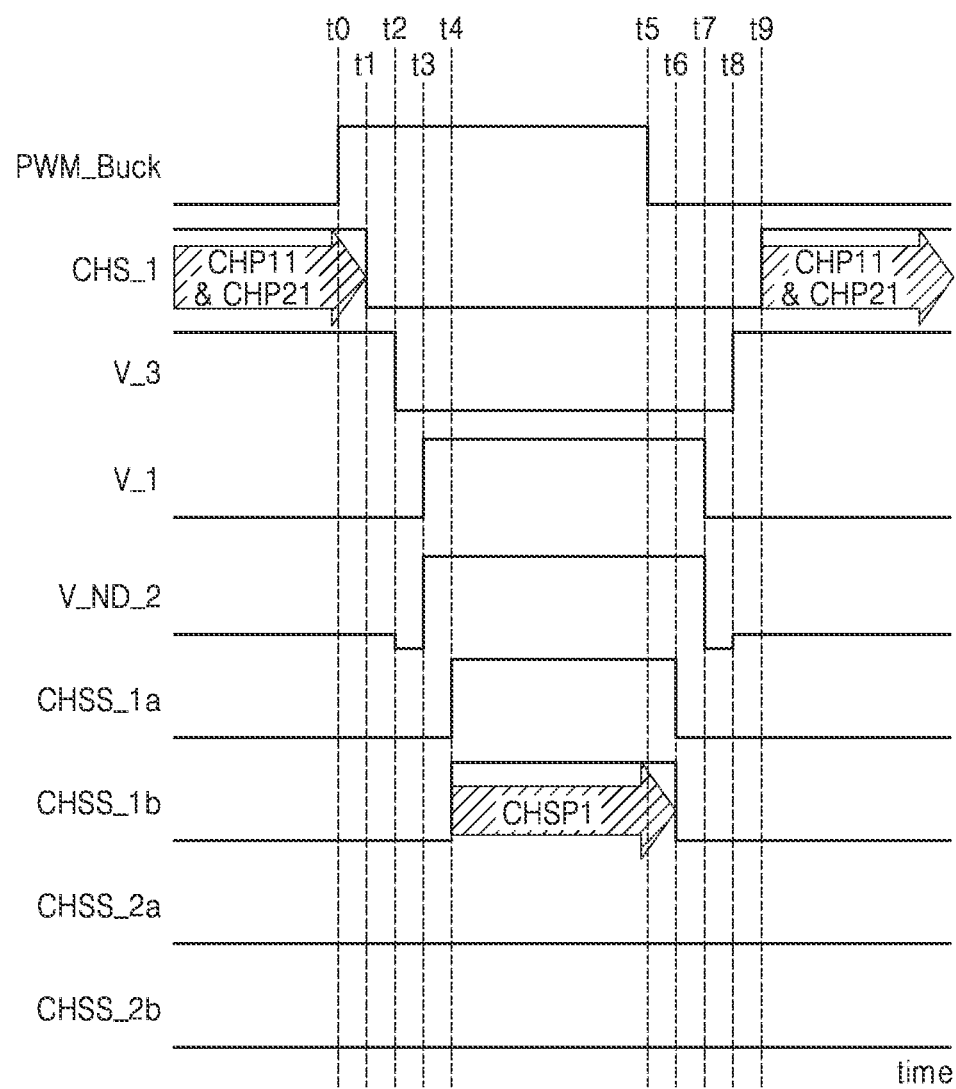

A more detailed explanation of the operation of the switching regulator 20 of FIG. 6 will be presented in relation to FIGS. 7A, 7B and 7C.

FIGS. 7A and 7B are respective operational circuit diagrams and FIG. 7C is a timing diagram. Collectively, FIGS. 7A, 7B and 7C illustrate operation of the switching regulator 20 in buck mode.

Referring to FIGS. 7A, 7B and 7C, the first signal S1 may be input to the first driver DRV_1 as a first pulse signal PWM_Buck, and the third signal S3 may be input to the third driver DRV_3 as an inverted first pulse signal PWM_Buck. At time 't0', the first pulse signal PWM_Buck may transition from a low level to a high level, and at time 't1', the first charging signal CHS_1 may transition from a high level to a low level. The first and second power switching elements PSW_11 and PSW_12 may be turned ON until time 't1' and form first and second charging paths CHP_11 and CHP_21. The first bootstrap capacitor CB_1 and the first flying capacitor CF_1 may be respectively charged through the first and second charging paths CHP_11 and CHP_21. At time 't2', the third voltage V_3 may transition from a high level to a low level, so that the third transistor TR_21 may be turned OFF. At time 't3', the first voltage V_1 may transition from a low level to a high level, so that the first transistor TR_11 may be turned ON. A voltage V_ND_2 of the second node ND_2 may decrease by a certain level at time 't2', and may transition to a high level at time 't3'. That is, the second node ND_2 may be disconnected from the ground node through the third transistor TR_21 and connected to the first node ND_1 through the first transistor TR_11, so that the voltage V_ND_2 of the second node ND_2 may increase by a certain level corresponding to an input voltage. The first bootstrap capacitor CB_1 may provide, to the first driver DRV_1, a voltage of the third node ND_3 boosted by the voltage V_ND_2 of the second node ND_2. At time 't4', the first and second charge sharing signals CHSS_1a and CHSS_1b may transition from a low level to a high level. Accordingly, the fifth and sixth power switching elements PSW_31 and PSW_32 may be turned ON to form a first charge sharing path CHSP_1 between the first flying capacitor CF_1 and the second bootstrap capacitor CB_2. The second bootstrap capacitor CB_2 may maintain a constant voltage level by receiving a charge through the first charge sharing path CHSP_1. As an example embodiment, a formation timing of the first charge sharing path CHSP_1 may be later than a turn-on timing of the first transistor TR_11.

At time 't5', the first pulse signal PWM_Buck may transition from a high level to a low level, and the first and second charge sharing signals CHSS_1a and CHSS_1b may transition from a high level to a low level at time 't6'. Accordingly, the fifth and sixth power switching elements PSW_31 and PSW_32 may be turned OFF, and the first charge sharing path CHSP_1 may be blocked. At time 't7', the first voltage V_1 may transition from a high level to a low level, so that the first transistor TR_11 may be turned OFF, and the second node ND_2 may be disconnected from the first node ND_1, and thus, the voltage V_ND_2 of the second node ND_2 may transition to a certain level. At time 't8', the third voltage V_3 may transition from a low level to a high level, so that the third transistor TR_21 may be turned ON, and the second node ND_2 may be connected to the ground node, and thus, the voltage V_ND_2 of the second node ND_2 may maintain a low level corresponding to a ground voltage. At time 't9', the first charging signal CHS_1 may transition from a low level to a high level, so that the first and second power switching elements PSW_11 and PSW_12 may be turned ON and form the first and second charging paths CHP_11 and CHP_21.

Figure 8A:
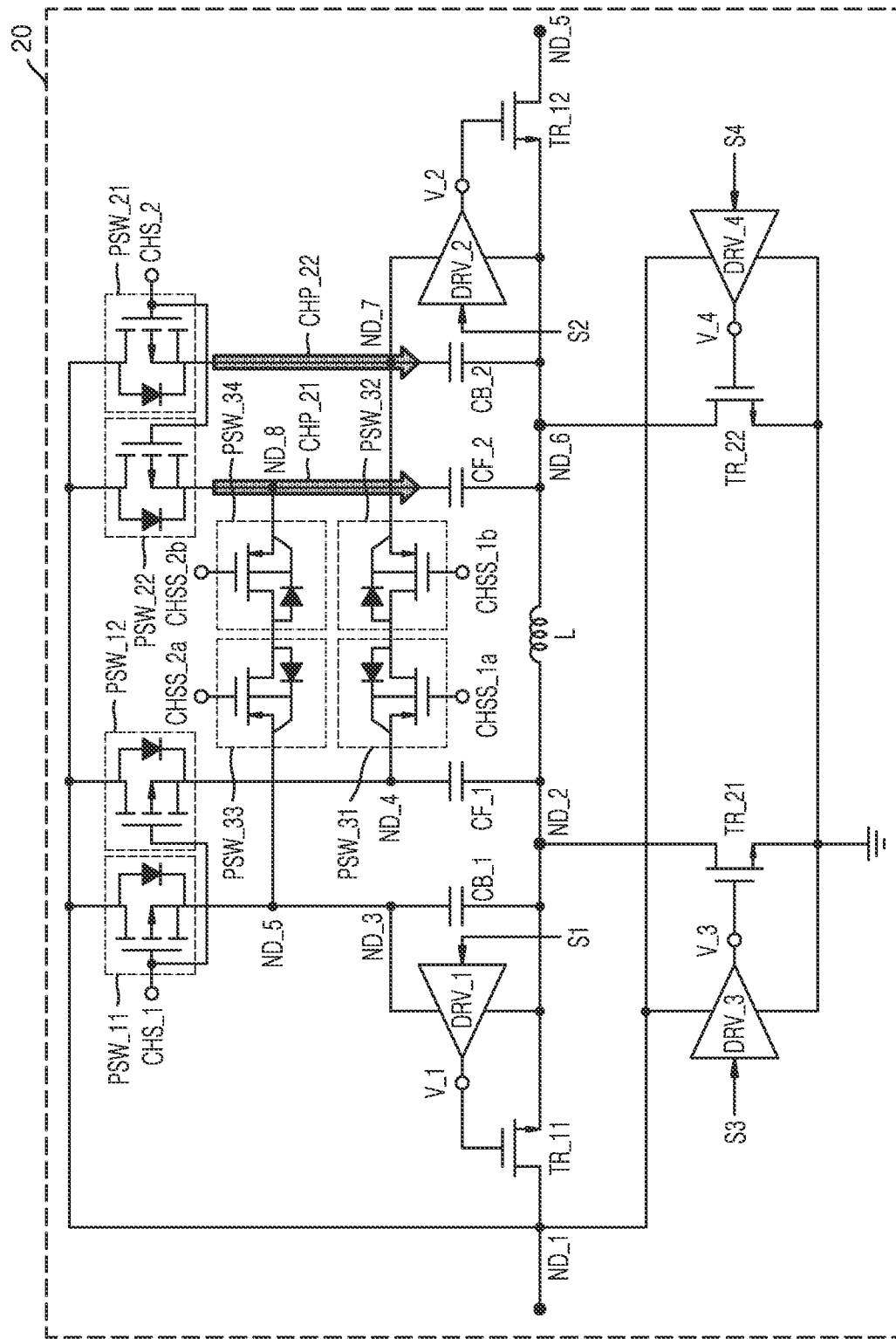
Figure 8B:
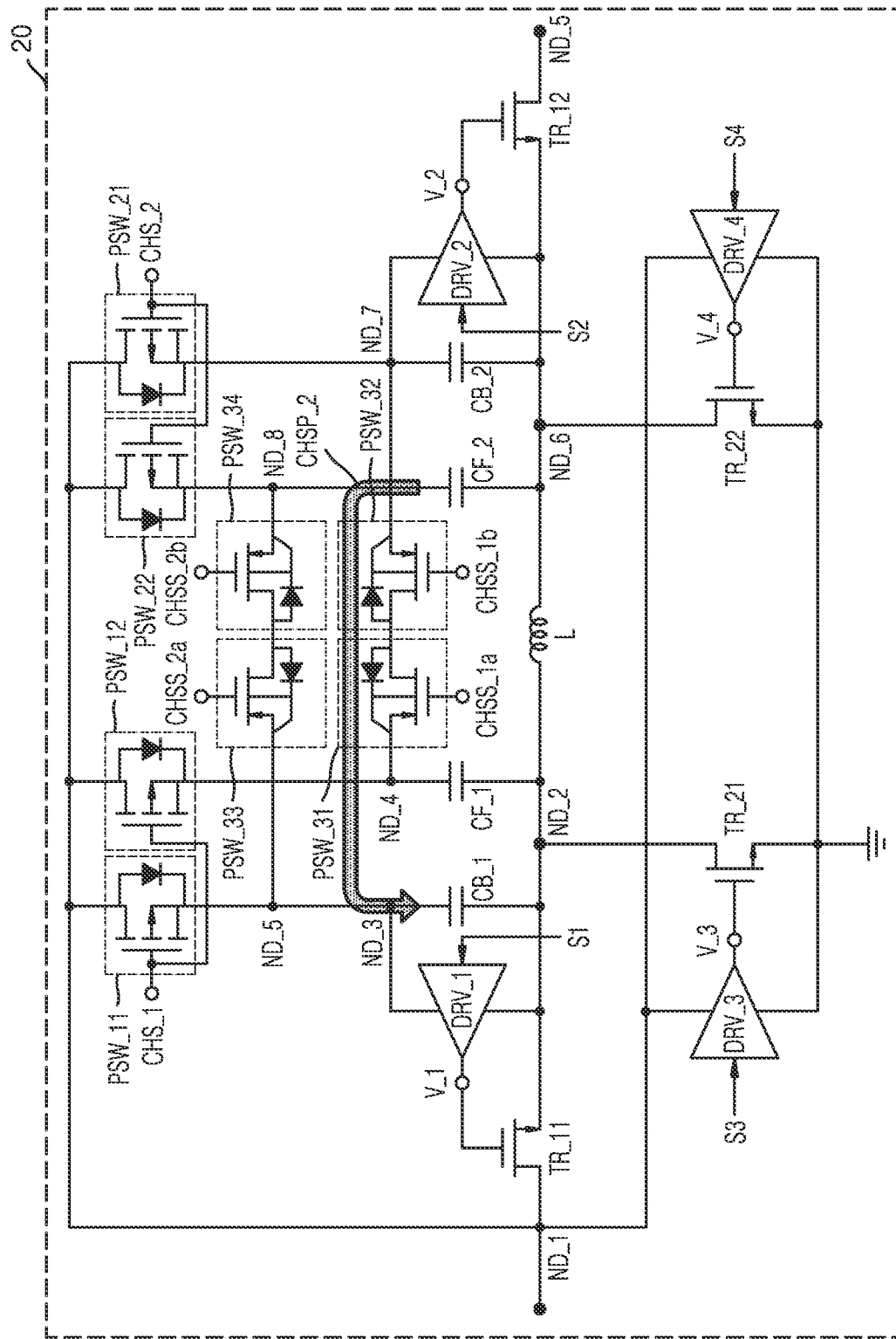
Figure 8C:
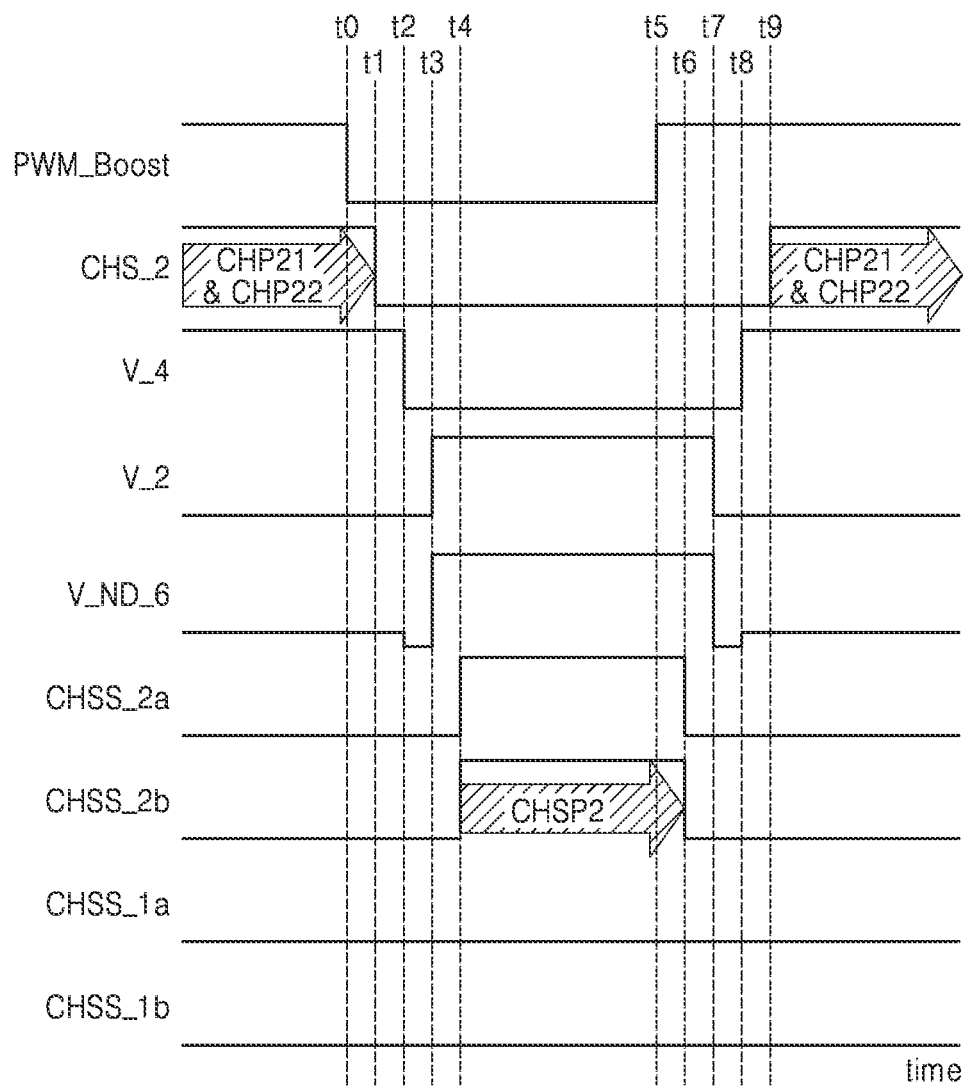

FIGS. 8A and 8B are respective operational circuit diagrams and FIG. 8C is a timing diagram. Collectively, FIGS. 8A, 8B and 8C illustrate operation of the switching regulator 20 in boost mode.

Referring to FIGS. 8A, 8B and 8C, the fourth signal S4 may be input to the fourth driver DRV_4 as a second pulse signal PWM_Boost, and the second signal S2 may be input to the second driver DRV_2 as an inverted second pulse signal PWM_Boost. At time 't0', the second pulse signal PWM_Boost may transition from a high level to a low level, and at time 't1', the second charging signal CHS_2 may transition from a high level to a low level. The third and fourth power switching elements PSW_21 and PSW_22 may be turned ON until time 't1' and form third and fourth charging paths CHP_12 and CHP_22. The second bootstrap capacitor CB_2 and the second flying capacitor CF_2 may be respectively charged through the third and fourth charging paths CHP_12 and CHP_22. At time 't2', the fourth voltage V_4 may transition from a high level to a low level, so that the fourth transistor TR_22 may be turned OFF. At time 't3', the second voltage V_2 may transition from a low level to a high level, so that the second transistor TR_12 may be turned ON. A voltage V_ND_6 of the sixth node ND_6 may decrease by a certain level at time 't2', and may transition to a high level at time 't3'. That is, the sixth node ND_6 may be disconnected from the ground node through the fourth transistor TR_22 and connected to the fifth node ND_5 through the second transistor TR_12, so that the voltage V_ND_6 of the sixth node ND_6 may increase by a certain level corresponding to an output voltage. The second bootstrap capacitor CB_2 may provide, to the second driver DRV_2, a voltage of the seventh node ND_7 boosted by the voltage V_ND_6 of the sixth node ND_6. At time 't4', the third and fourth charge sharing signals CHSS_2a and CHSS_2b may transition from a low level to a high level. Accordingly, the seventh and eighth power switching elements PSW_33 and PSW_34 may be turned ON to form a second charge sharing path CHSP_2 between the second flying capacitor CF_2 and the first bootstrap capacitor CB_1. The first bootstrap capacitor CB_1 may maintain a constant voltage level by receiving a charge through the second charge sharing path CHSP_2. As an example embodiment, a formation timing of the second charge sharing path CHSP_2 may be later than a turn-on timing of the second transistor TR_12.

At time 't5', the second pulse signal PWM_Boost may transition from a low level to a high level, and the third and fourth charge sharing signals CHSS_2a and CHSS_2b may transition from a high level to a low level at time 't6'. Accordingly, the seventh and eighth power switching elements PSW_33 and PSW_34 may be turned OFF, and the second charge sharing path CHSP_2 may be blocked. At time 't7', the second voltage V_2 may transition from a high level to a low level, so that the second transistor TR_12 may be turned OFF, and the sixth node ND_6 may be disconnected from the fifth node ND_5, and thus, the voltage V_ND_6 of the second voltage V_2 may transition to a certain level. At time 't8', the fourth voltage V_4 may transition from a low level to a high level, so that the fourth transistor TR_22 may be turned ON, and the sixth node ND_6 may be connected to the ground node, and thus, the voltage V_ND_6 of the sixth node ND_6 may maintain a low level corresponding to a ground voltage. At time 't9', the second charging signal CHS_2 may transition from a low level to a high level, so that the third and fourth power switching elements PSW_21 and PSW_22 may be turned ON and form the third and fourth charging paths CHP_12 and CHP_22.

Figure 9:
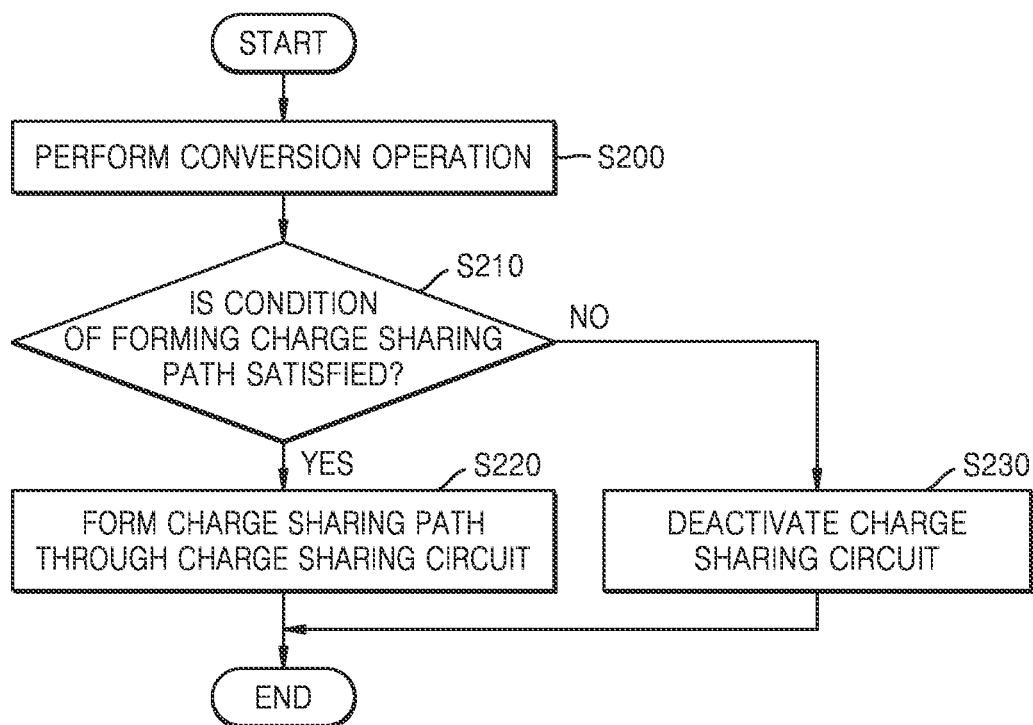
FIG. 9 is a flowchart illustrating an operating method for a switching regulator according embodiments of the inventive concept.

FIG. 9 is a flowchart illustrating an operating method for a switching regulator according to embodiments of the inventive concept.

Referring to FIG. 9, the switching regulator may perform a conversion operation on an input voltage in a defined conversion mode (S200). The switching regulator may then determine whether a condition of forming a charge sharing path is satisfied before forming the charge sharing path for charging a bootstrap capacitor (S210). For example, the determination of whether the condition of forming a charge sharing path is satisfied may be based on voltages apparent at both ends of a bootstrap capacitor. (A more detailed descriptions of this approach will be presented hereafter in relation to FIGS. 10 and 11). When the condition of forming the charge sharing path is satisfied (S210=YES), the switching regulator may form a charge sharing path through a charge sharing circuit (S220), else when the condition of forming the charge sharing path is not satisfied (S210=NO), the switching regulator will deactivate the charge sharing circuit (S230).

Figure 10:
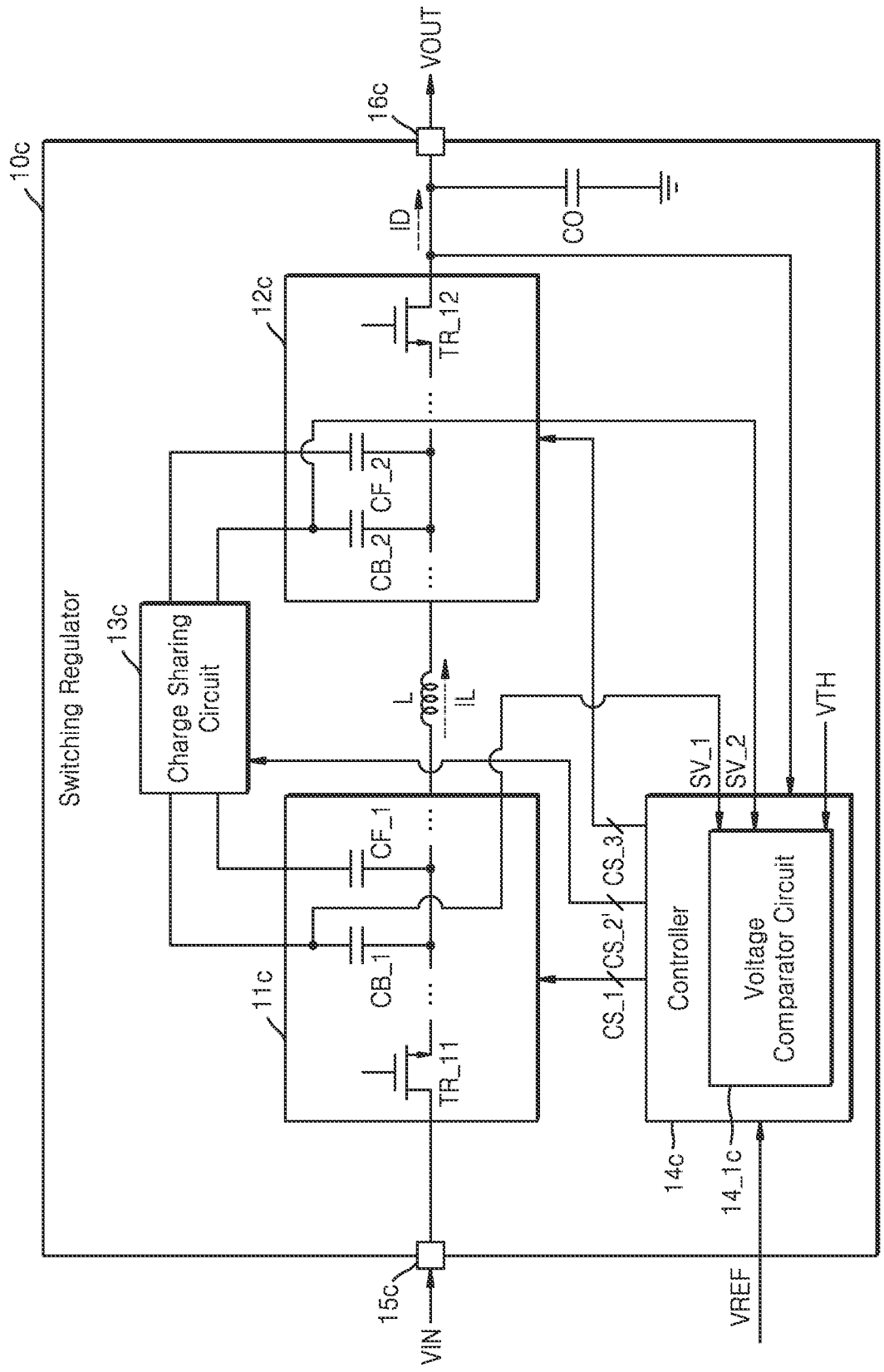
FIG. 10 is a block diagram of a switching regulator including a voltage comparator circuit according to embodiments of the inventive concept.

FIG. 10 is a block diagram illustrating a switching regulator 10c including a voltage comparator circuit 14_1c according to embodiments of the inventive concept.

Referring to FIG. 10, a controller 14c of the switching regulator 10c may further include the voltage comparator circuit 14_1c. When voltages of the first and second bootstrap capacitors CB_1 and CB_2 are further charged by a charge sharing circuit 13c to a voltage state exceeding a threshold level, voltages boosted by the first and second bootstrap capacitors CB_1 and CB_2 may exceed an allowable value and cause deterioration of the first and second transistors TR_11 and TR_12 due to excessive heating. To prevent this, the voltage comparator circuit 14_1c may control the charge sharing circuit 13c by considering respective voltage states of the first and second bootstrap capacitors CB_1 and CB_2.

For example, the voltage comparator circuit 14_1c may receive first and second sensing voltages SV_1 and SV_2 form one end of the first and second bootstrap capacitors CB_1 and CB_2, as well as a threshold voltage VTH. In some embodiments, the voltage comparator circuit 14_1c may receive voltages of the first and second flying capacitors CF_1 and CF_2 instead of the first and second sensing voltages SV_1 and SV_2 to determine whether to form a charge sharing path. The voltage comparator circuit 14_1c may compare either one, or both, of the first and second sensing voltages SV_1 and SV_2 with the threshold voltage VTH to generate a second control signal CS_2' based on the comparison result. For example, the voltage comparator circuit 14_1c may compare, before forming a first charge sharing path for charging the second bootstrap capacitor CB_2, the second sensing voltage SV_2 of a positive terminal of the second bootstrap capacitor CB_2 with the threshold voltage VTH and determine whether to form the first charge sharing path based on the comparison result. That is, the voltage comparator circuit 14_1c may generate the second control signal CS_2' only when the second sensing voltage SV_2 is less than the threshold voltage VTH, so that the charge sharing circuit 13c may form the first charge sharing path. In addition, the voltage comparator circuit 14_1c may compare, before forming a second charge sharing path for charging the first bootstrap capacitor CB_1, the first sensing voltage SV_1 of a positive terminal of the first bootstrap capacitor CB_1 with the threshold voltage VTH and determine whether to form the second charge sharing path based on the comparison result. That is, the voltage comparator circuit 14_1c may generate the second control signal CS_2' only when the first sensing voltage SV_1 is less than the threshold voltage VTH, so that the charge sharing circuit 13c may form the second charge sharing path.

Figure 11:
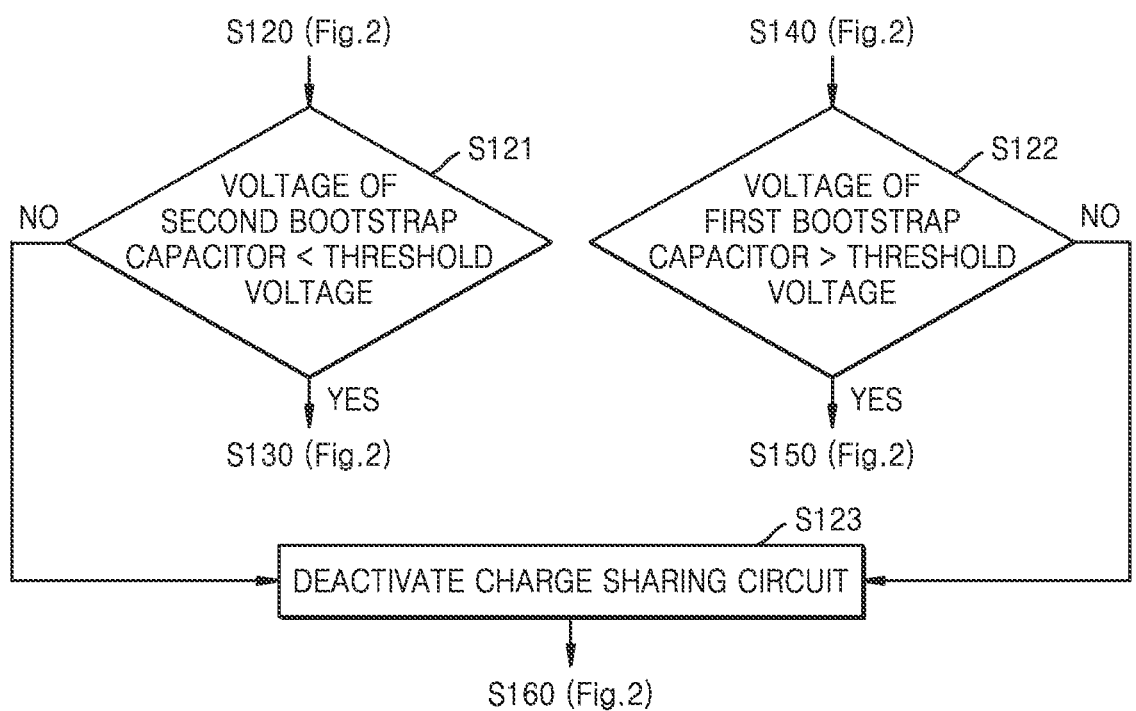
FIG. 11 is a flowchart illustrating an operating method of a switching regulator according to embodiments of the inventive concept.

FIG. 11 is a flowchart illustrating an operating method for a switching regulator according to embodiments of the inventive concept. The method of FIG. 11 will be described in the context of the switching regulator 10c of FIG. 10, and may be understood as an extension of, or variation on, the method of FIG. 2.

Referring to FIG. 11, during operation in the buck mode (S120), the voltage comparator circuit 14_1c may determine whether the second sensing voltage SV_2 of the second bootstrap capacitor CB_2 is less than the threshold voltage VTH (S121). When the second sensing voltage SV_2 of the second bootstrap capacitor CB_2 is less than the threshold voltage VTH (S121=YES), the method proceeds to step (S130) in the method of FIG. 2, else when the second sensing voltage SV_2 of the second bootstrap capacitor CB_2 is not less than the threshold voltage VTH (S121=NO), the charge sharing circuit is deactivated (S123).

In similar manner but during operation in the boost mode (S140), the voltage comparator circuit 14_1c may determine whether the first sensing voltage SV_1 of the first bootstrap capacitor CB_1 is less than the threshold voltage VTH (122S). When the first sensing voltage SV_1 of the first bootstrap capacitor CB_1 is less than the threshold voltage VTH (S122=YES), the method proceeds to step (S150) in the method of FIG. 2, else when the first sensing voltage SV_1 of the first bootstrap capacitor CB_2 is not less than the threshold voltage VTH (S122=NO), the charge sharing circuit is deactivated (S123).

Figure 12:
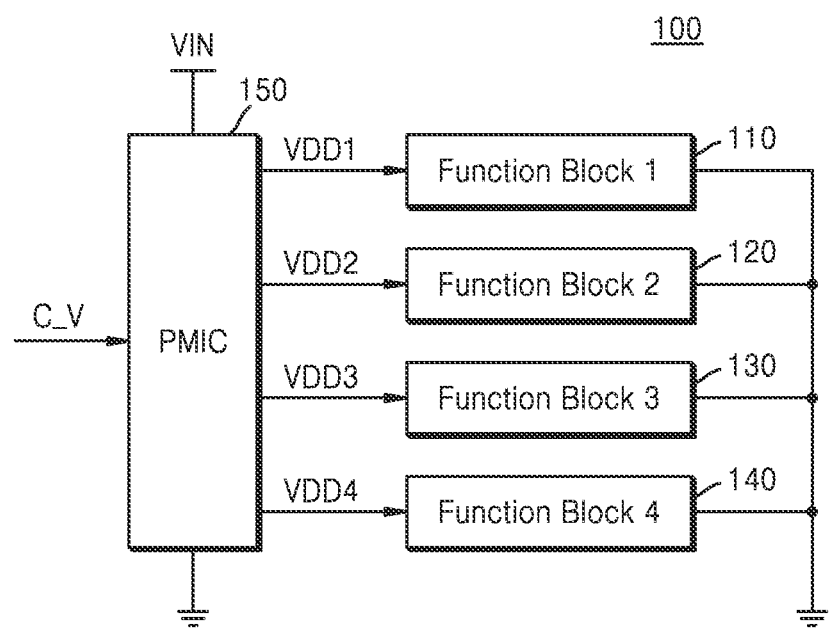
FIG. 12 is a block diagram illustrating a system according to embodiments of the inventive concept.

FIG. 12 is a block diagram illustrating a system 100 according to embodiments of the inventive concept. The system 100 may be a single semiconductor integrated circuit such as a system-on-a-chip (SoC). In some embodiments, the system 100 may include a printed circuit board with various packets mounted thereon. As shown in FIG. 12, the system 100 may include first, second, third and fourth (hereafter collectively, "first to fourth") functional blocks 110, 120, 130 and 140, as well as a power management integrated circuit (PMIC) 150.

The first to fourth functional blocks 110 to 140 may respectively operate based on power provided by first, second, third and fourth (hereafter collectively, "first to fourth") supply voltages VDD1, VDD2, VDD3 and VDD4 output from the PMIC 150. For example, at least one of the first to fourth functional blocks 110 to 140 may be a digital circuit that processes digital signals such as an application processor (AP) or an analog circuit that processes analog signals such as an amplifier. In addition, the at least one of the first to fourth functional blocks 110 to 140 may be a circuit that processes mixed signals such as an analog-to-digital converter (ADC). Although the system 100 is illustrated as including four functional blocks in FIG. 12, the system 100 may include less than four or at least five functional blocks in some embodiments.

The PMIC 150 may generate the first to fourth supply voltages VDD1 to VDD4 from the input voltage VIN and may change a level of at least one of the first to fourth supply voltages VDD1 to VDD4 according to a voltage control signal C_V. At least one of the first to fourth functional blocks 110 to 140 may receive a supply voltage of a level that dynamically changes according to required performance and power consumption. For example, the first functional block 110 may be an image processor that processes image data, the first functional block 100 may receive the first supply voltage VDD1 of a high level when processing a video including a series of images, and the first functional block 100 may receive the first supply voltage VDD1 of a low level when processing a photo including a single image. The PMIC 150 may receive a voltage control signal C_V corresponding to performance and power consumption required by the first functional block 110, and the PMIC 150 may increase or decrease the level of the first supply voltage VDD1 based on the voltage control signal C_V. In this manner, a method of dynamically changing a level of a supply voltage of a functional block may be referred to as dynamic voltage scaling (DVS).

The PMIC 150 may include the switching regulator described above with reference to the drawings, and accordingly, the first supply voltage VDD1 may be stably supplied to the first functional block 110, and thus, the operational reliability of the first functional block 110 and the system 110 may be improved. In addition, the PMIC 150 may be susceptible to further miniaturization, thereby facilitating an improved degree of integration for the system 100. Like the first functional block 110, the PMIC 150 may stably supply the second to fourth supply voltages VDD2 to VDD4 to the second to fourth functional blocks 120 to 140, respectively.

Figure 13:
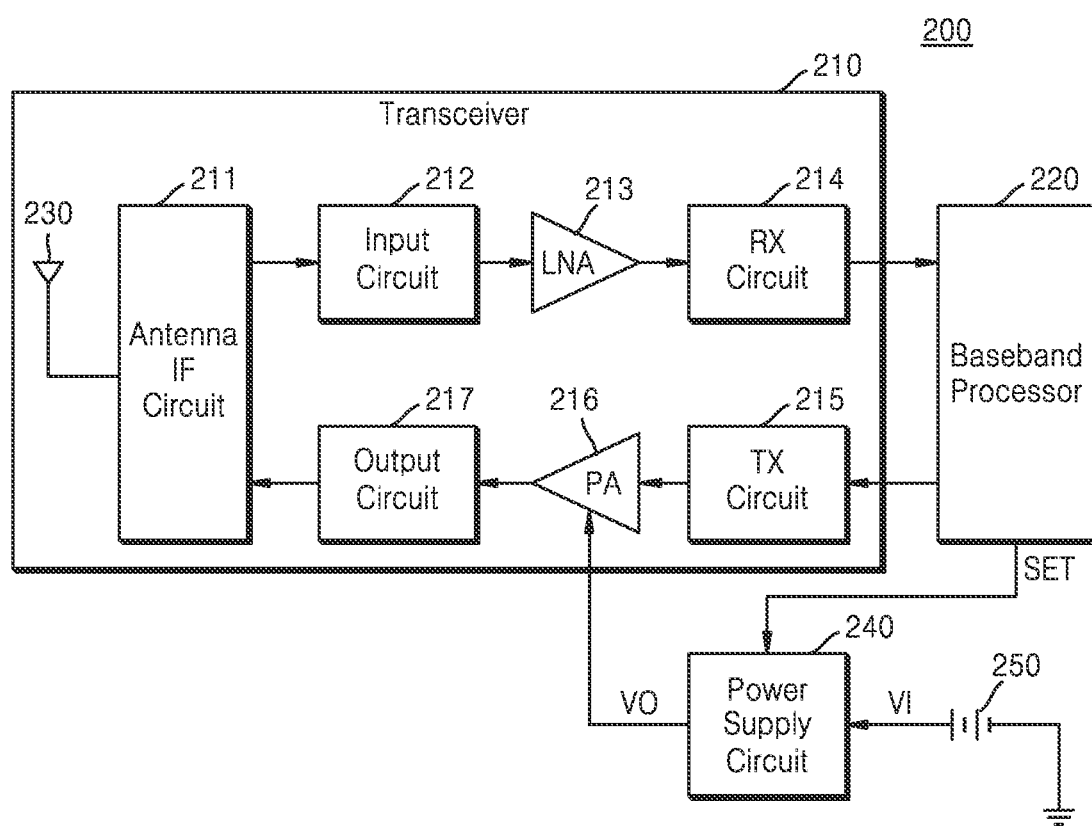
FIG. 13 is a block diagram illustrating a wireless communication device according to embodiments of the inventive concept.

FIG. 13 is a block diagram illustrating a wireless communication device 200 according to embodiments of the inventive concept. Here, FIG. 13 illustrates a user equipment (UE) (or a terminal) powered by a battery 250. In some embodiment, the wireless communication device 200 may be included within a wireless communication system using a cellular network such as fifth-generation wireless (5G), long term evolution (LTE), or the like, or may be included in a wireless local area network (WLAN) system or any other wireless communication system. In the wireless communication device 200, a switching regulator according to an example embodiment of the inventive concept may be used to provide variable power to a power amplifier (PA) 216. As shown in FIG. 13, the wireless communication device 200 may include a transceiver 210, a baseband processor 220, an antenna 230, a power supply circuit 240, and the battery 250.

The transceiver 210 may include an antenna interface circuit 211, and may include an input circuit 212, a receiver including a low-noise amplifier 213 and a receiving circuit 214, a transmitting circuit 215, the PA 216, and a transmitter including an output circuit 217. The antenna interface circuit 211 may connect the transmitter or a receiver to the antenna 230 according to a transmission mode or a reception mode. In some embodiments, the input circuit 212 may include a matching circuit or a filter, the low-noise amplifier 213 may amplify an output signal of the input circuit 212, and the receiving circuit 214 may include a mixer for down-conversion. In some embodiments, the transmission circuit 215 may include a mixer for up-conversion, the PA may amplify an output signal of the transmission circuit 215, and the output circuit 217 may include a matching circuit or a filter.

The baseband processor 220 may transmit and receive baseband signals to and from the transceiver 210, and may perform modulation/demodulation, encoding/decoding, or the like. In some embodiments, the baseband processor 220 may be referred to as a modem. The baseband processor 220 may generate a setting signal SET for setting an average power tracking mode or an envelope tracking mode, or may generate a setting signal SET for changing a level of an output voltage VO.

The power supply circuit 240 may receive an input voltage VI from the battery 250 and generate the output voltage VO providing power to the PA 216. The power supply circuit 240 may include the switching regulator described above with reference to the drawings, and accordingly, the output voltage VO having a stable level may be provided to the PA 216. As a result, the transceiver 210 may ensure an improved communication performance.

While the inventive concept has been particularly shown and described with reference to embodiments thereof, it will be understood that various changes in form and details may be made therein without departing from the spirit and scope of the following claims.

What is claimed is:

1. A switching regulator that generates an output voltage from an input voltage, the switching regulator comprising:
a first switching circuit including a first transistor, a first flying capacitor and a first bootstrap capacitor, wherein in a first conversion mode, the first transistor selectively connects a first node receiving the input voltage in response to a first switching control signal, and the first bootstrap capacitor boosts the first switching control signal;
a second switching circuit including a second transistor, a second flying capacitor and a second bootstrap capacitor, wherein in a second conversion mode, the second transistor selectively connects a second node receiving the output voltage in response to a second switching control signal, and the second bootstrap capacitor boosts the second switching control signal; and
a charge sharing circuit configured to selectively form at least one of a first charge sharing path between the first flying capacitor and the second bootstrap capacitor and a second charge sharing path between the second flying capacitor and the first bootstrap capacitor in response to one of the first conversion mode and the second conversion mode.

2. The switching regulator of claim 1, wherein during a first period of the first conversion mode, the first bootstrap capacitor and the first flying capacitor are connected in parallel to the first node, and during a second period of the first conversion mode following the first period of the first conversion mode, the first bootstrap capacitor boosts the first switching control signal to turn ON the first transistor, and the first flying capacitor is connected to the second bootstrap capacitor through the first charge sharing path.

3. The switching regulator of claim 2, wherein the charge sharing circuit forms the first charge sharing path after the first transistor is turned ON.

4. The switching regulator of claim 2, wherein during the first period and the second period of the first conversion mode, the second transistor is continuously turned ON and connected to the second node.

5. The switching regulator of claim 1, wherein during a first period of the second conversion mode, the second bootstrap capacitor and the second flying capacitor are connected in parallel to the first node, and during a second period of the second conversion mode following the first period of the second conversion mode, the second bootstrap capacitor boosts the second switching control signal to turn ON the second transistor, and the second flying capacitor is connected to the first bootstrap capacitor through the second charge sharing path.

6. The switching regulator of claim 5, wherein the charge sharing circuit forms the second charge sharing path after the second transistor is turned ON.

7. The switching regulator of claim 5, wherein during first period and the second period of the second conversion mode, the first transistor is continuously turned ON and connected to the first node.

8. The switching regulator of claim 1, wherein the first conversion mode corresponds to a buck mode, and the second conversion mode corresponds to a boost mode.

9. The switching regulator of claim 1, wherein the charge sharing circuit further includes:

at least one first power switching element that selectively forms the first charge sharing path; and at least one second power switching element that selectively forms the second charge sharing path.

10. The switching regulator of claim 1, wherein a capacitance of the first flying capacitor and the second flying capacitor is less than a capacitance of the first bootstrap capacitor and the second bootstrap capacitor.

11. The switching regulator of claim 1, wherein the first switching circuit further includes first power switching elements configured to respectively form first charging paths for the first bootstrap capacitor and the first flying capacitor from the first node, and the second switching circuit further includes second power switching elements configured to respectively form second charging paths for the second bootstrap capacitor and the second flying capacitor from the first node.

12. The switching regulator of claim 1, wherein the charge sharing circuit is further configured to form the first charge sharing path when a voltage of the second bootstrap capacitor is less than a threshold voltage, and form the second charge sharing path when a voltage of the first bootstrap capacitor is less than the threshold voltage.

13. The switching regulator of claim 1, further comprising:

a controller configured to set one of the first conversion mode and the second conversion mode in accordance with a target level of the output voltage, and to control the first switching circuit, the second switching circuit, and the charge sharing circuit in accordance with the one of the first conversion mode and the second conversion mode.

14. The switching regulator of claim 1, wherein the first transistor and the second transistor include an n-channel metal oxide semiconductor (nMOS) transistor.

15. A switching regulator that generates an output voltage from an input voltage, the switching regulator comprising:

a first transistor connected to a first node receiving the input voltage and alternately turned ON/OFF in a buck mode;

a first bootstrap capacitor that boosts a gate voltage of the first transistor;

a second transistor connected to a second node outputting the output voltage and continuously turned ON in the buck mode;

a second bootstrap capacitor that boosts a gate voltage of the second transistor; and a first flying capacitor that shares charge with the second bootstrap capacitor in the buck mode, and a second flying capacitor that shares charge with the first bootstrap capacitor in the boost mode, wherein the first transistor is continuously turned ON in boost mode, and the second transistor is alternately turned ON/OFF in the boost mode.

16. The switching regulator of claim 15, further comprising:

a charge sharing circuit configured to selectively form a first charge sharing path between the first flying capacitor and the second bootstrap capacitor in the buck mode, and form a second charge sharing path between the second flying capacitor and the first bootstrap capacitor in the boost mode.

17. The switching regulator of claim 15, wherein the first bootstrap capacitor and the first flying capacitor are connected in parallel to the first node in the buck mode.

18. An operating method for a switching regulator, the operating method comprising:

disconnecting a first transistor from a first node receiving an input voltage during a first period in a buck mode;

charging a first bootstrap capacitor and a first flying capacitor with the input voltage during the first period in the buck mode;

connecting the first transistor to the first node during a second period in buck mode following the first period in the buck mode;

boosting a gate voltage of the first transistor by the first bootstrap capacitor during the second period in the buck mode; and sharing charge with a second bootstrap capacitor using the first flying capacitor during the second period in the buck mode to boost a gate voltage of a second transistor connected to a second node outputting an output voltage of the switching regulator.

19. The operating method of claim 18, further comprising:

disconnecting the second transistor from the second node during a first period in a boost mode;

charging the second bootstrap capacitor and a second flying capacitor with the input voltage during the first period in the boost mode;

connecting the second transistor to the second node during a second period in boost mode following the first period in the boost mode;

boosting a gate voltage of the second bootstrap capacitor using the second bootstrap capacitor during the second period in the boost mode; and sharing charge with the first bootstrap capacitor using the second flying capacitor during the second period in the boost mode.

\* \* \* \* \*